United States Patent [19]

Kutner et al.

[11] Patent Number: 5,142,537
[45] Date of Patent: Aug. 25, 1992

[54] VIDEO SIGNAL PROCESSING CIRCUIT

[75] Inventors: Michael A. Kutner; Kaichi Tatsuzawa, both of Kanagawa, Japan

[73] Assignee: Sony Corporation, Tokyo, Japan

[21] Appl. No.: 474,541

[22] Filed: Feb. 2, 1990

[30] Foreign Application Priority Data

| Feb. 8, 1989 [JP] | Japan | 1-027645 |
| Feb. 9, 1989 [JP] | Japan | 1-030618 |
| Feb. 18, 1989 [JP] | Japan | 1-039034 |

[51] Int. Cl.$^5$ .............................................. H04N 5/94
[52] U.S. Cl. .................................... 371/31; 360/38.1; 358/160
[58] Field of Search ................... 371/31; 358/160, 163, 358/167, 21 R; 360/38.1

[56] References Cited

U.S. PATENT DOCUMENTS

| 4,470,065 | 9/1984 | Reitmeier | 358/163 |
| 4,517,600 | 5/1985 | Reitmeier | 358/163 |
| 4,586,082 | 4/1986 | Wilkinson | 358/160 |
| 4,605,966 | 8/1986 | Collins | 358/163 |
| 4,656,514 | 4/1987 | Wilkinson et al. | 358/160 |
| 4,792,953 | 12/1988 | Pasdera et al. | 371/31 |
| 4,825,440 | 4/1989 | Heitmann et al. | 371/31 |

FOREIGN PATENT DOCUMENTS

| 0180764 | 5/1986 | European Pat. Off. |
| 2073534 | 10/1981 | United Kingdom |
| 2154825 | 9/1985 | United Kingdom |

Primary Examiner—Jerry Smith
Assistant Examiner—Henry C. Lebowitz
Attorney, Agent, or Firm—Alvin Sinderbrand; William S. Frommer

[57] ABSTRACT

A video signal processing circuit carries out error correction, error concealment and weighted mean processing sequentially on video signals reproduced by a video tape recorder. One and two dimensional error concealment modes are provided respectively utilizing sample data on the same line as erroneous sample data to be concealed, and sample data in peripheral and/or time displaced relation to the erroneous sample data. One of a plurality of error concealment modes is selected depending upon the state of error flags for the peripheral and/or time displaced sample data. In certain advantageous embodiments, original sample data for which a gray code has been set, is compared with error concealed data and the original sample data is output in place of the error concealed data where such comparison indicates that the difference between the two is within a predetermined acceptance threshold.

Weighted mean sample data processing provides the capability of producing a first field of a video signal from a second field thereof by summing sample data from a plurality of lines of the second field to form the signals of the first field. In certain advantageous embodiments, the signals of the second field are multiplied by selectably variable coefficients, the selection of which is based on a detection that at least one of the line signals of the second field is outside an effective image information portion thereof.

17 Claims, 23 Drawing Sheets

FIG. 3a  ERROR STATE  ○ ○ ○ × ○ ○ ○
SAMPLE DATA  P3 P2 P1 P0 M1 M2 M3

FIG. 3b  ERROR STATE  △ ○ ○ × ○ ○ △
SAMPLE DATA  P3 P2 P1 P0 M1 M2 M3

FIG. 3c  ERROR STATE  □ △ ○ × ○ △ □
SAMPLE DATA  P3 P2 P1 P0 M1 M2 M3

| FIG.4A |
| FIG.4B |

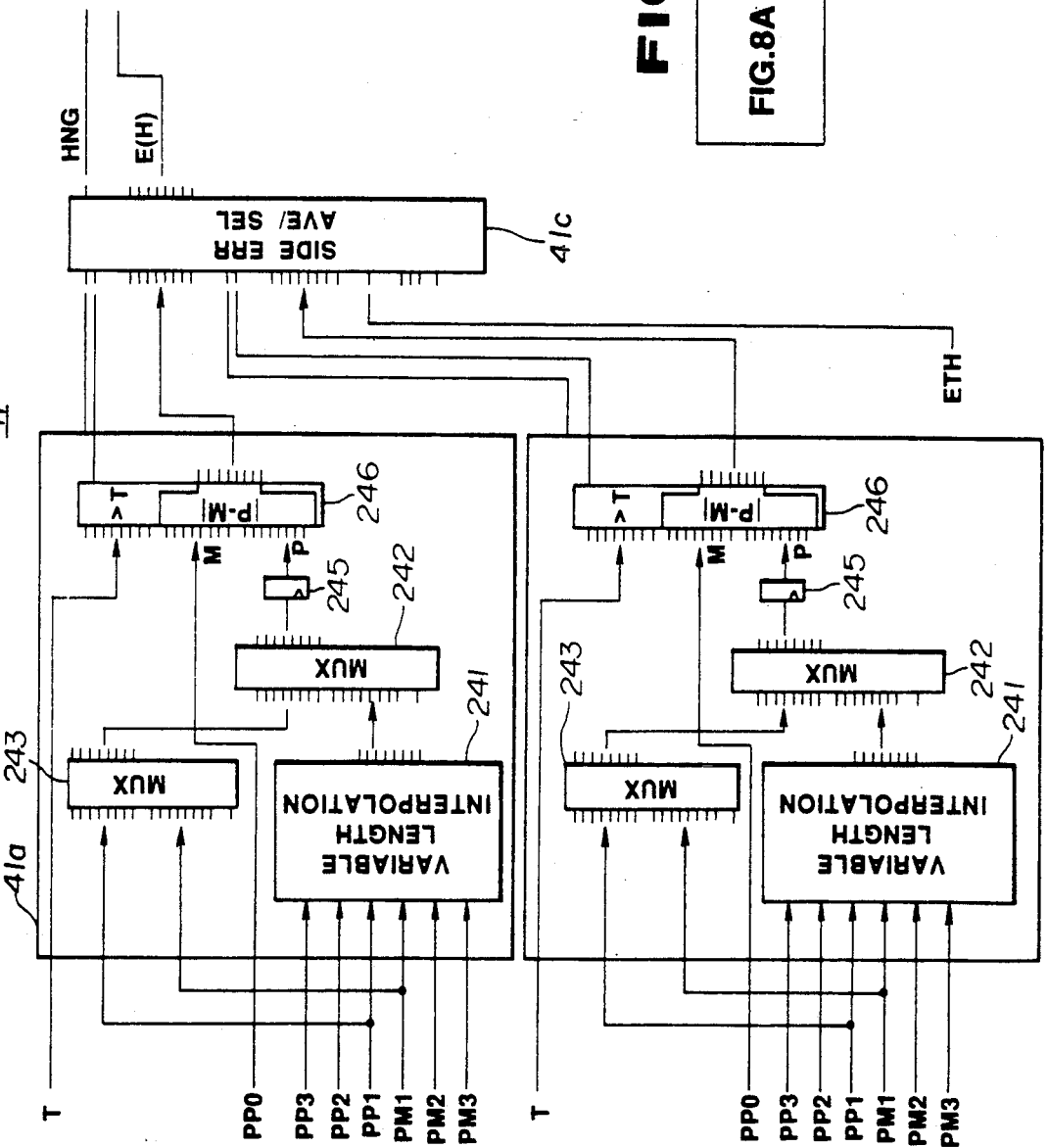

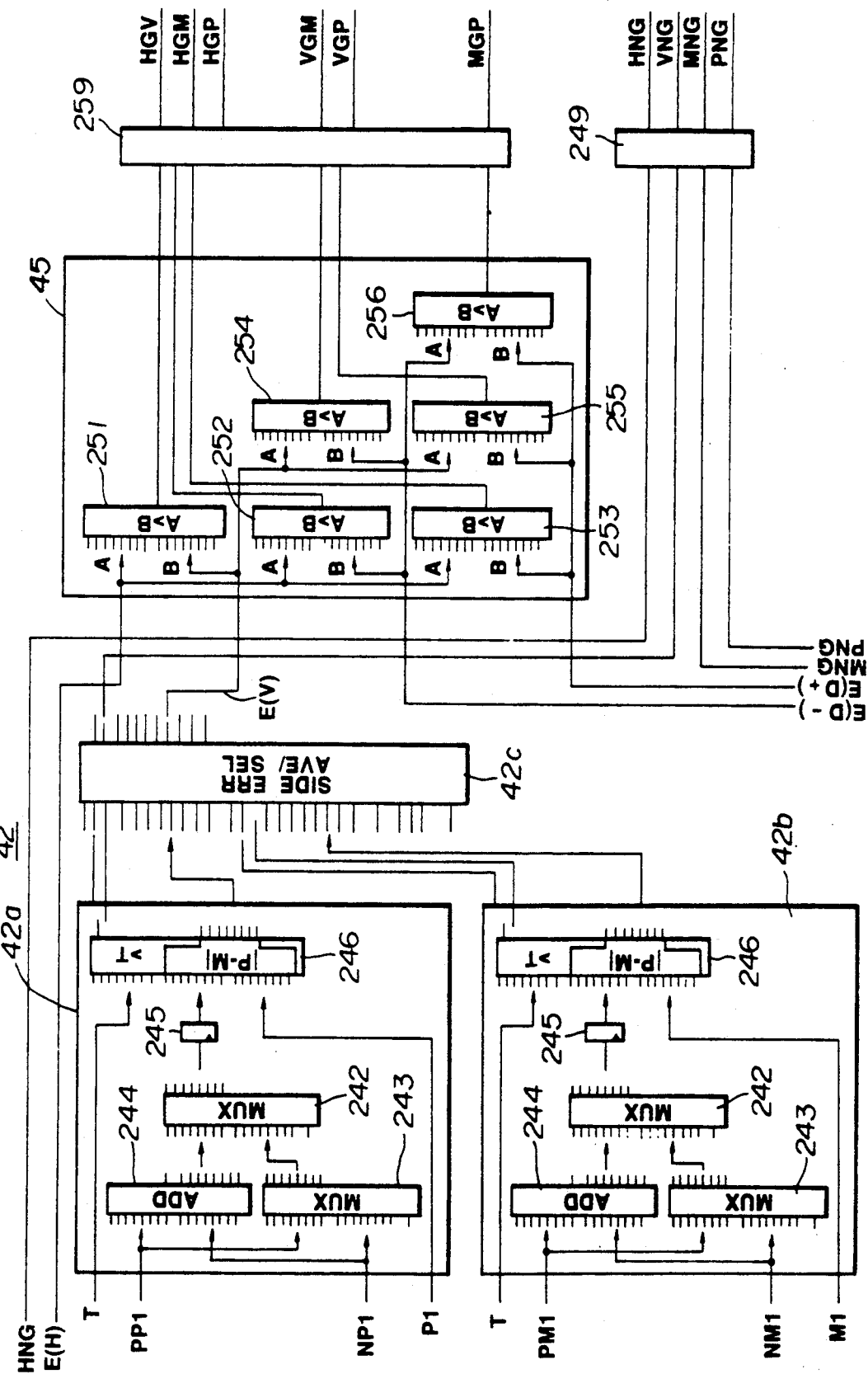

P5 P4 P3 P2 P1 P0

VIDEO SIGNAL PROCESSING CIRCUIT

BACKGROUND OF THE INVENTION

1. Field of the Invention

This invention relates to video signal processing circuits. More particularly, it relates to such circuits in which video signals, for example, from a video tape recorder, are subjected to error correction, error concealment and weighted mean processing.

2. Description of the Prior Art

In recording and/or reproducing digital sample data of video signals by means of a digital video tape recorder (VTR), so-called "code errors" result from noise or defects in the recording medium. The erroneous sample data produced by the code errors are subjected to error correction using error correction codes and those which cannot be thus corrected are subjected to error concealment by interpolation or replacement using other error-free sample data. In generating a sequence of odd and even numbered fields which have been disrupted as a consequence of reproduction at a speed different from that employed during recording, weighted mean processing is frequently performed in which signals of a given field are used to form signals of another field.

In the so-called "D-1" format (a 4:2:2 format set forth in CCIR recommendations No. 601), which is one of the formats used in component digital VTR, two-dimensional error correction using a product code is performed, which involves the use so-called "outer" and "inner" codes. During recording, 360-byte-per-line sample data are subjected to in-line shuffling, and then are fed to a two-dimensional error correction coding circuit where product codes are added thereto. First, a 2-bit outer code, i.e. outer correction code or outer purity, is annexed at intervals of 30 bytes or samples. The resulting code block is subjected to sector array shuffling and then a 4-byte inner code, i.e., inner correction code or inner party, is annexed at intervals of 60-bytes-per-row of sample data in the perpendicular direction of the shuffled code block to form an inner code block. A sync block structure generated from two such inner code blocks is recorded as a unit on the magnetic tape. During playback, an operation which is the reverse of the above mentioned operation is performed. Thus, two of the inner code blocks are removed from the sync block and subjected to error correction with the use of the inner code, followed by deshuffling which is the reverse of the above described sector array shuffling. Finally, a so-called erasure correction is performed, using 2-byte outer codes at intervals of each outer code block having 32 bytes per row.

Any erroneous sample data, which could not be error corrected through the use of the product code, are subjected to error concealment by interpolation or replacement. Among the methods for error concealment are (1) a method of interpolation in the horizontal or H direction, using sample data on both sides of and on the same line as the erroneous sample data, (2) a method of interpolation in the vertical or "V" direction, using sample data at the same horizontal position as and on lines above and below the line of the erroneous sample data, (3) a method of interpolation in the $D_+$ direction, using near-by sample data on a positive diagonal line of the reproduced video image, that is, a diagonal line with a rightward positive gradient, (4) a method of interpolation in the $D_-$ direction, using near-by sample data on a negative diagonal, that is, on a diagonal with a negative gradient from left to right, (5) a method of replacement with error-free samples of the preceding frame or field exhibiting high temporal correlation, and (6) a method of replacing the erroneous sample data with near-by sample data.

Meanwhile, it is desirable for actual error concealment to function over a wide range of error rates, for example, over a range from substantially 0% during normal reproduction to substantially 100% during high speed tape shuttling.

However, an error concealment method with a high concealment accuracy may operate properly for a low error rate but fail to operate properly for a high error rate, while an error concealment method which is usable even at a high error rate may suffer from low concealment accuracy, such that no single concealment method is fully effective o conceal errors with suitable or acceptable concealment accuracy over the above mentioned wide range of error rates. Even if it were possible to use a plurality of error concealment methods in combination and to provide the ability to switch manually from one to the other manual switching is cumbersome and undesirable from the standpoint of operational reliability.

On the other hand, in case of a high error rate in the sample data reproduced by the VTR, most of the sample data are erroneous and thus cannot be error concealed by interpolation or replacement. It is however desirable that some sort of error concealment be carried out even on these occasions.

Additionally, it occurs frequently that correct sample data are contained in sample data which as a whole have been determined to be in error in the course of the error correction process. For example, in the course of the above-mentioned outer error correction, when the number of erasure pointers generated by the inner error correction product code exceeds the number of parities of the outer code, it is possible to compute the syndrome of the outer code block without performing error correction thereon, when all of these syndromes are determined to be "0", under the assumption that all of the sample data in the outer code block are free of errors. However, in employing the inner code or inner parity, it is possible that erroneous data will be deemed to be correct since it is not certain that the inner code or parity has sufficient error detection capability to generate correct erasure pointers, or if error detection by the outer code or parity exhibits a sufficient reliability. It is undesirable from the viewpoint of reliability to treat such sample data as being error free, while it is wasteful to discard it as erroneous.

When weighted mean processing is to be performed in order to synthesize signals of one field from signals of a given or existing field after error concealment, several horizontal delay devices are required for error concealment, and especially for two-dimensional error concealment, while several other horizontal delay elements are required for weighted mean processing. However, the use of dedicated horizontal delay devices for error concealment and weighted mean processing would be uneconomical.

Finally, when weighted mean processing operations are performed at the upper and lower ends of the picture surface the image quality may deteriorate and the picture may suffer from flicker or vertical movement.

OBJECTS AND SUMMARY OF THE INVENTION

It is an object of the present invention to provide a video signal processing circuit which is free of the above drawbacks.

It is another object of the present invention to provide a video signal processing circuit in which effective error concealment may be performed over a wide range of error rates.

It is a further object of the present invention to provide a video signal processing circuit whereby optimum error concealment may be performed within a wide range of error rates up to 100%.

It is a further object of the present invention to provide a video image processing circuit wherein a mode-independent concealment strategy is adopted in which the concealment method used is independent of the current playback mode and the best possible concealment method for the current error situation can be selected.

It is a further object of the present invention to provide a video image processing circuit wherein variable-length horizontal interpolation is employed in which the number of samples used in the horizontal concealment calculation can be varied automatically from two to six samples.

It is a further object of the present invention to provide a video signal processing circuit having an ideal direction ranking capability in which the concealment directions may be ranked from best to worst.

It is a further object of the present invention to provide a video signal processing circuit wherein luminance data are used to determine the ideal direction ranking, which direction ranking may be used for both luminance and chrominance concealment.

It is a further object of the present invention to provide a video signal processing circuit wherein an error threshold serves to limit the use of a concealment method based on an estimated concealment error value.

It is a further object of the present invention to provide a video signal processing circuit wherein adaptive temporal replacement is employed such that video data and error flags surrounding a point being concealed are examined to determine whether the data in a current frame is substantially the same as the video data in a preceding frame and, based on such determination, using such video data from the preceding frame to conceal errors in the current frame.

It is a further object of the present invention to provide a video signal processing circuit including concealment circuitry having its own frame memory.

It is a further object of the present invention to provide a video signal processing circuit wherein the maximum number of recursion levels allowed for recursive concealment is made variable in order to selectably determine the maximum concealment area that may be derived from an error-free point.

It is a further object of the present invention to provide a video signal processing circuit wherein, for sample data that may not actually be erroneous the concealment value produced by a concealment method is compared with the original value of the sample data and, if the difference therebetween is less than a pass-through threshold value, the original value is output in place of the concealment value.

It is a further object of the present invention to provide a video signal processing circuit wherein, when performing weighted mean processing for synthesizing signals of one field from signals of a given or known field, for correcting an odd and even sequence of the fields which has been disrupted horizontal delay devices are used in common for the respective processing operations to reduce the required number of such delay devices.

It is yet another object of the present invention to provide a video signal processing circuit in which weighted mean processing is carried out using selectably different signal combination methods for sample data at the upper and the lower edges of the picture surface, on the one hand and for sample data at the inner portions, on the other.

BRIEF DESCRIPTION OF THE DRAWINGS

FIG. 3 depicts error states of sample data for illustrating the operating principle of the one-dimensional error concealment circuit of FIG. 2.

FIG. 8 is a guide for arranging FIGS. 8A, 8B and 8C.

FIGS. 8A, 8B and 8C together constitute a block circuit diagram showing a more detailed construction of the ranking control circuit of FIG. 7.

DESCRIPTION OF THE PREFERRED EMBODIMENTS

OVERALL CONSTRUCTION OF VIDEO SIGNAL PROCESSING SYSTEM

Figure 1:
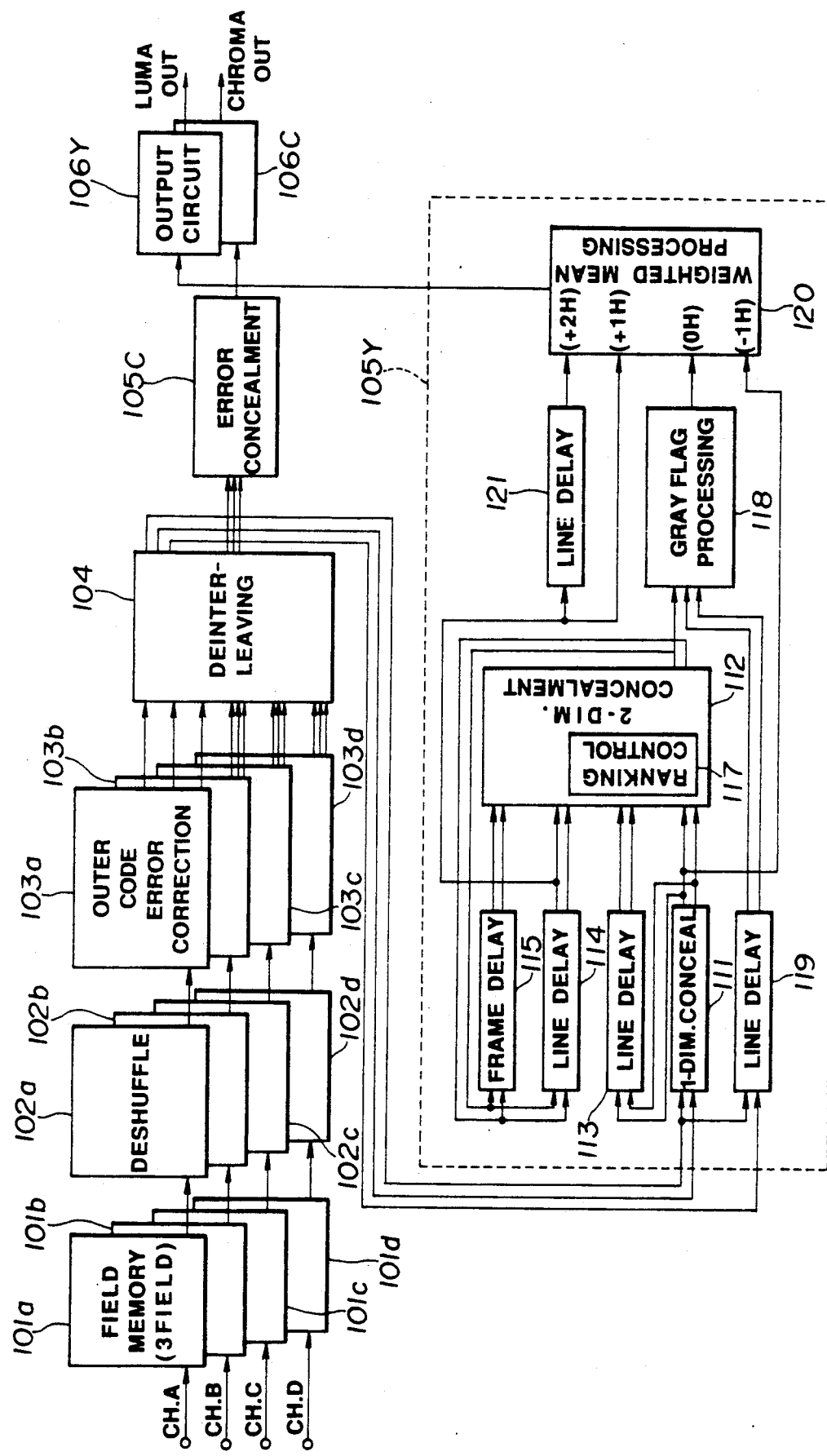
FIG. 1 is a block diagram showing the general organization of a video signal processing circuit according to an embodiment of the present invention and its peripheral circuitry.

FIG. 1 shows, in a block diagram, a video signal processing circuit according to an embodiment of the present invention, and its peripheral circuitry. In the present illustrative embodiment, signal processing is assumed to be performed on signals reproduced by a D-1 format digital VTR. A D-1 format digital VTR is so constructed that digital video (and audio) signals are allocated to e.g. four channels and the digital signals of these four channels are recorded and/or reproduced in parallel by four rotary magnetic heads.

Thus, the four-channel reproduction signals (a to d channel signals) from the four magnetic heads of the digital VTR are subjected to clock regeneration, demodulation and error correction through the use of a so-called "inner code", i.e. inner correction code or inner parity previously added to the signals. The four channel data thus subjected to inner code error correction are transmitted to field memories 101a, 101b, 101c and 101d shown in FIG. 1. Each of these field memories 101a to 101d has a memory capacity of, e.g., three fields. The video data of the respective channels sequentially read out from these field memories 101a to 101d are transmitted to deshuffle circuits 102a, 102b, 102c, 102d for deshuffling and then transmitted to outer code error correction circuits 103a, 103b, 103c, 103d for error correction through the use of a so-called "outer code", i.e outer correction code or outer parity likewise added to the signals previously. At this time, the gray flags (described hereinbelow) are annexed to the data, in addition to the usual error flags. These four channels of video data, including error flags and gray flags, are transmitted to a deinterleaving circuit for deinterleaving and are grouped together, while being separated into a luminance component and a chrominance component, which are transmitted to a luminance component error concealment section 105Y and a chrominance component error concealment section 105C. The luminance component data and the chrominance component data, with errors concealed by the error concealment sections 105Y, 105C, respectively, are output by way of output circuits 106Y, 106C, respectively.

The gray flag is briefly explained hereinafter. In the D-1 format digital VTR, a two-dimensional error correction is performed by a product code using so-called outer and inner codes. Thus, during recording, 360-byte-per-line sample data in one channel are subjected to product code error correction coding. First, at intervals of 30 bytes or 30 samples a to byte outer code, that is outer correction code or outer parity, is generated and annexed and the data are subjected to a second array shuffling to form a 32 sample×60 row product block array. Then, at an interval of 60 samples per row a 4-byte inner code, that is, inner correction code or inner parity, is generated and annexed to form 32 rows of inner code blocks, with each row consisting of 64 samples. Two of the 64-sample inner code blocks are connected together and a sync pattern (2 bytes) and an identification pattern (4 bytes) are annexed to a leading position to form a sync block. The data is recorded on magnetic tape wherein each sync block is regarded as one recording unit.

In reproduction, an operation which is the reverse of the above described sequence is performed. Thus, two inner code blocks are taken out from the sync block and subjected to error correction with the use of the inner code to produce data of the above mentioned product block array organization which are then input to the field memories 101a to 101d of FIG. 1 as the input data. In deshuffling circuits 102a to 102d, a deshuffling operation, which is the reverse of the above mentioned sector array shuffling operation, is performed. In the outer code correction circuits 103a to 103d, a so-called erasure correction is performed, at intervals of 32 sample-per-column outer code blocks using the two-byte outer code. The erasure pointer used at this time is obtained at the time of the above mentioned inner code error correction.

Meanwhile, when there is a large number of error samples in the inner code block such that error correction becomes impossible because the error correction ability of the inner code is overloaded, the inner code block in its entirety is deemed to be in error and erasure pointers are set. The inner code block is passed to erasure correction by the outer code. The outer code acts perpendicularly to the inner code. It is capable of detecting if any errors exist, and can correct one or two errors (erasures). Normally, when the number of erasure pointers is three or more, (i.e. the inner code is overloaded for three or more inner code blocks), the error correction capability of the outer code block is also overloaded and the entire block is marked as being in error for purposes of error concealment. However, when random error is encountered it occurs frequently that, even when a small number of sample data in the inner code block are in an error state, the remaining sample data are correct data, i.e. error-free data. Thus, considering that most data of the inner code block deemed to be in error in their entirety are, in fact, correct data, all data in the outer code block may be assumed to be correct if, as a result of error detection by the outer code, such is determined to be free of errors. However, in view of the possibility of mistaken error detection, it is not desirable that the block be handled as completely correct data only on the basis of the results of error detection by the outer code. Thus, to indicate seemingly correct data, gray flags are introduced. Thus, where sample data is deemed to be in error as a whole by inner code error detection but deemed to be free of error by the results of error detection by the outer code, the error flag is reset, while the gray flag is set. When the difference upon comparison of the original sample data with the result of error concealment is within a predetermined threshold, the probability is extremely high that the data are correct so that the original sample data are handled as the correct data.

The sample data which have been corrected for errors, inclusive of sample data which are in error and which have not been corrected for errors, are transmitted, along with the error flags and the gray flags, so as to be supplied to the error concealment units 105Y, 105C for error concealment.

GENERAL CONSTRUCTION OF ERROR CONCEALMENT UNIT

The arrangement of the luminance component error concealment unit 105Y and the chrominance component error concealment unit 105C, shown in FIG. 1, is hereinafter explained. Since the concealment units 105Y, 105C are of substantially the same construction, only one of the units, herein the luminance component error concealment unit 105Y, is explained.

To the luminance component error concealment unit 105Y, there are supplied, in association with the luminance component of the component digital video signals, sample data which have been corrected for errors as described above, together with error flags and gray flags. Of these, the sample data and the error flags are first transmitted to a one-dimensional concealment circuit 111 for error concealment in the horizontal direction, that is, in the direction of the horizontal scanning lines, and then transmitted to a two-dimensional concealment circuit 112 and a line delay circuit 113 having a delay time of 1H, i.e. one horizontal scanning period. The outputs (the sample data and the delayed error flags) from the two-dimensional concealment circuit 112 are transmitted to a line delay circuit 114 and a frame delay circuit 115 having a delay time of one frame (1F=2V=2 vertical scanning periods). The outputs from these line delay circuits 113, 114 and from the frame delay circuit 115 (sample data and error flags) are transmitted to the two-dimensional concealment circuit 112. The output signal from the line delay circuit 113 is the reference signal for a current line 0H, whereas the output from the one-dimensional concealment circuit 111 corresponds to the sample data and error flags for −1H, that is, one line below the current line, the output from the line delay circuit 114 corresponds to the sample data and error flags for +1H, that is, one line above the current line and the output from the frame delay circuit 115 corresponds to the sample data and error flags for +1F, that is, the current line of the previous frame. In other words, sample data for the current line, the lines directly above and below the current line and the current line of the previous frame, are supplied to the two-dimensional error concealment circuit 112.

If a delay TD caused by processing in the two-dimensional error concealment 112 is to be taken into account, it is sufficient if the delay time in the line delay circuit 114 and the frame delay circuit 115 are set so as to be $H-T_D$ and $F-T_D$, respectively.

In the two-dimensional error concealment circuit 112, an optimum error concealment is performed, using the sample data on the above mentioned four lines. This two-dimensional error concealment circuit 112 has a plurality of error concealing functions, including interpolation in a plurality of directions, replacement of the erroneous sample data by sample data at the same position of the previous frame or replacement of the erroneous sample data by vicinal or neighboring sample data and execution of error concealment in an ideal direction which will minimize changes in the sample data. For finding this optimum direction, a ranking control circuit 117 is provided within the two-dimensional error concealment circuit 112. It is in this ranking control circuit 117 that the optimum direction of two-dimensional error concealment is found on the basis of the sample data and the error flags and, based on the results, an optimum two-dimensional error concealment is executed.

In the above described manner, error concealment is performed on the erroneous sample data which have not been corrected for errors in the course of the error correction of the preceding stage.

A weighted mean processing circuit is hereinafter described. The sample data from the two-dimensional concealment circuit 112 are transmitted to a weighted mean processing circuit 120 by way of a gray flag processing circuit 118. Sample data are simultaneously supplied to this weighted mans processing circuit 120, from (a) one line above the current line (i.e. +1H), provided from the line delay circuit 114, (b) sample data at the relative position of +2H, that is, two lines above the current line, after a delay introduced in a line delay circuit 121, and (c) sample data at the relative position of −1H, that is, one line below the current line, from the one-dimensional concealment circuit 111. In the weighted mean processing circuit 120, video sample data from a plurality of lines are summed together in a predetermined mixing ratio to provide signals for at least another field from the signals of a given field. This processing is performed to compensate for disorders in the sequence of even- and odd-numbered fields brought about by different speed reproduction of VTR video signals.

Meanwhile, if the processing time $T_D$ in the two dimensional concealment circuit 112 and the processing time $T_G$ in the gray flag processing circuit 118 is to be taken into consideration, it is sufficient to set the delay time in the line delay circuit 121 to $1H+T_D+T_G$, while introducing a delay circuit having a delay time equal to $T_D+T_G$ between the line delay circuit 114 and the weighted mean processing circuit 120 and between the one-dimensional concealment circuit 111 and the weighted mean processing circuit 120.

In the circuitry of FIG. 1, a signal delayed by 1H in the line delay circuit 113 is transmitted by way of the two dimensional concealment circuit 112 and a gray flag processing circuit 118 to the weighted mean processing circuit 120 to provide a 0H or reference position signal. On the other hand, a line delayed by 1H in the line delay circuit 114 and the 1H delayed signal further delayed through a line delay circuit 121 are transmitted to the weighted mean processing circuit 120 to provide, respectively a +1H signal, that is, the signal one line above the reference position signal and a +2H signal, that is, a signal two lines above the reference signal. The signal from the one-dimensional concealment circuit 111 is the −1H signal, that is, the signal one line below the reference signal. In this manner, the line delays induced by the line delay circuit 113, 114, simultaneously produce the necessary plural line signals at the weighted mean processing circuit. In other words, the line delay circuits 113, 114 are used simultaneously in two-dimensional error concealment and in weighted mean processing. In this manner, one delay circuit may be used in lieu of three line delay circuits dedicated to weighted mean processing in the conventional system, so that a significant saving may be realized in memory capacity.

In the circuitry of FIG. 1, of the four video signals transmitted to the weighted mean processing circuit 120, the −1H, signal is directly supplied from the one-dimensional concealment circuit 111 and thus remains in the state prevailing before the two-dimensional concealment is executed. However, in view of the low weighing factor for the −1H sample data at the time of the weighted mean processing operation, it is not crucial to perform high precision concealment and hence no practical problem is raised. It is however, possible to add a line delay circuit in the weighted mean processing circuit to delay the signal from the line delay circuit 121 further by 1H and to supply the thus delayed signal to the circuit 120 without using the video signal from the one-dimensional concealment circuit 111. In this case, the delay of the output signal from the delay circuit 114 is the reference 0H and that of the output signal from the two-dimensional concealment circuit 112 is −1H such the totality of the four input video signal is replaced by signals which have undergone two-dimensional concealment. In this case, although two line delay circuits each in the two-dimensional error concealment processing section and in the weighted mean processing circuit, thus totalling four line delay circuits, are required, one line delay circuit may be saved as compared with one conventional system.

ERROR CONCEALMENT METHODOLOGY

The error flags associated with luminance video sample data and multiplexed chrominance video sample data are inspected. It is assumed that both of a pair of chrominance sample data exist in association with one of two luminance sample data.

Even when the video sample data supplied to the error concealment section assume values in the range from 01H to FEH of the hexadecimal number system, it is possible to produce output sample data in the range from 00H to FFH of the hexadecimal number system. In the present invention, sample data ranging from 00H to FFH of the hexadecimal number system may be accepted for concealment.

An error flag "1" indicates that the error correction circuit has marked a given sample datum as being in error. In one embodiment, the concealment method assumes that all of the error flags in the horizontal and vertical image blanking areas are "1".

The relation between luminance data concealment and chrominance data concealment is hereinafter explained. The luminance data are used to generate a ranking of the concealment direction from the best to the least desirable. In regular video data, luminance data provide a satisfactory prediction of the concealment direction for both the luminance data and the chrominance data, so that this concealment direction ranking may be used for both the luminance and chrominance concealments. It may however occur that a calculation for concealment in the best ranking direction cannot be executed because of the state of the error flags. Hence, for each of the luminance and the chrominance signals, the optimum direction is found within the range of possible concealment calculation operation. If the luminance error pattern differs from that for chrominance, the practical concealment direction for luminance differs from that for chrominance.

Meanwhile, in the present illustrative embodiment, a one-dimensional error concealment and a two-dimensional error concealment are performed in sequence. Two different classes of concealment strategies, that is, true and temporary strategies, are employed for the one-dimensional error concealment. The true concealment strategies are variable-length-interpolation, neighbor replacement and distant replacement, as later described, whereas temporary concealment strategy means long distance replacement and last good sample replacement, similarly as later described. In a broad sense, the true strategies are a subset of the more general two-dimensional concealment strategies. If one of the true strategies is possible, and if the two-dimensional concealment section cannot find a better method, then the two-dimensional concealment section simply passes through the one-dimensional results. However, if a better two-dimensional strategy is found then the two-dimensional section overwrites the one-dimensional result with a two-dimensional result. Temporary one-dimensional concealment results are always overwritten by a two-dimensional concealment strategy. These temporary concealment strategies are provided so that one-dimensional concealment can conceal all erroneous points.

The two-dimensional error concealment is actually a superset of one-dimensional error concealment. In the present embodiment, since the sample data after passing through one-dimensional error concealment is passed to the two-dimensional error concealment, the calculation in the horizontal direction is omitted in the two-dimensional concealment circuit. That is, the two-dimensional circuit simply determines if the appropriate concealment was already performed by the one-dimensional concealment circuit.

ONE-DIMENSIONAL ERROR CONCEALMENT

One-dimensional error concealment means an error concealment in the horizontal direction (H-direction) employing data of samples which are in the vicinity of the reference sample point to be concealed and which are on the same line as that on which the reference sample point is located. It includes an interpolation employing interpolated values obtained by taking a weighted mean of the neighboring sample data and a replacement directly employing any one of the neighboring sample data. In the interpolation in the horizontal direction, from 2 to 6 neighboring samples are used by way of a variable-length interpolation, as will be explained subsequently. The number of samples is determined by inspecting the error flags and finding the longest possible error-free concealment length.

Figure 2:
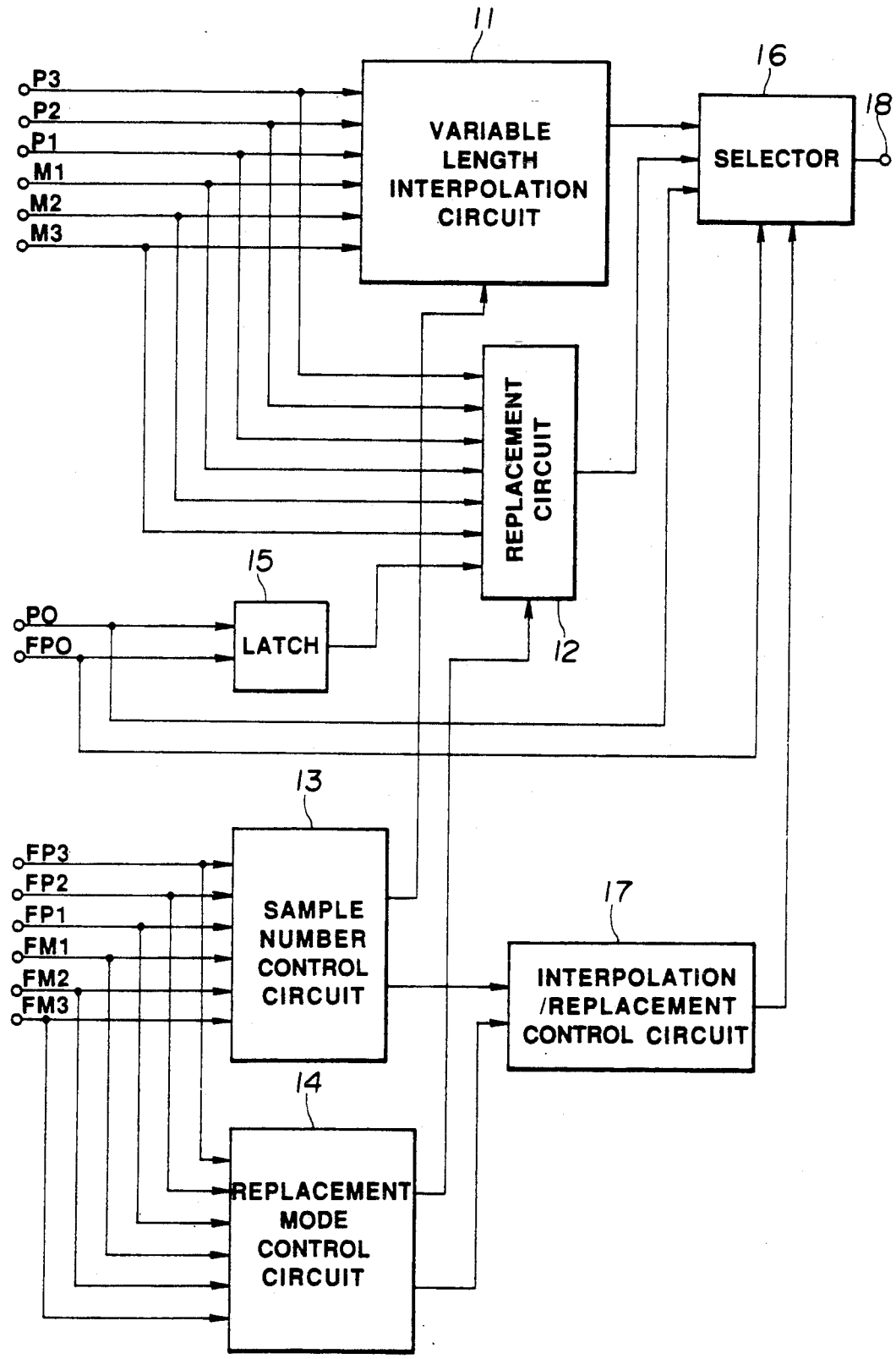
FIG. 2 is a block diagram showing a typical construction of a one-dimensional error concealment circuit.

FIG. 2 shows a practical example of the aforementioned one-dimensional error concealment circuit 111, and for illustrating the operation of the one-dimensional error concealment. FIG. 3 shows the error states of neighboring sample data on the same line as that on which the erroneous sample data is located.

The practical one-dimensional error concealment circuit shown in FIG. 2 is, in general made up of an interpolation section and a replacement section. The interpolation section performs error concealment using interpolated values, for example, weighted mean values, based on a plurality of sample data on both sides of the erroneous sample data and performs variable-length interpolation using a variable number of sample data on both sides of the erroneous sample data. The replacement section operates to substitute one of the sample data in the vicinity of and on the same line as the erroneous sample data for the erroneous sample data.

With a sample data P0, shown in FIG. 3, as the reference sample data to be concealed by one-dimensional error concealment, the variable length interpolation section includes a variable length interpolation circuit 11 for calculating a weighted mean value using a plurality of sample data, such as P1 to P3 and M1 to M3, on both lateral sides of the reference sample data P0, and a sample number control circuit 13 for detecting error flags FP1 to FP3 and FM1 to FM3 associated with these sample data P1 to P3 and M1 to M3 and controlling the number of the sample data used for calculating the weighted mean value and the weighting coefficients on the basis of the results of such error flag detection. The replacement section includes a replacement circuit 12 for substituting one error-free sample data from the sample data P1 to P3 and M1 to M3 for the reference sample data P0 and a replacement mode control circuit 14 for detecting the error flags FP1 to FP3 and FM1 to FM3 and identifying the sample data employed for replacement based on the results of such detection. The error-concealed sample data from the circuits 11 and 12 is supplied to a selector 16 where the sample data from the interpolating operation is output at a terminal 18, or the sample data from the replacement operation is output at the terminal 18, depending on whether interpolation was performed or else was not feasible so that replacement was instead performed. When the reference sample data P0 is error-free, with the error flag being "0", the sample data P0 is directly output at the terminal. The output sample data from the terminal 18 is transmitted to the two-dimensional error concealment circuit 112 shown in FIG. 1.

It is noted that, since the sample data along a given line of the image are distributed on the four channels, as described hereinabove, for recording or reproduction, sample data of the same channel are separated by the interposition of the other three channels therebetween. In other words, with the above mentioned 6-sample interpolation, for restoration of sample data of a given channel, samples of the three other channels are employed. Thus, when the number of samples for an arithmetic operation for interpolation is increased beyond six samples, the samples of the same channels as that of the reference sample to be concealed would be used, so that an advantage corresponding to the increase in hardware cannot be expected. The reason is that, when an error flag of a sample is set, the risk is high that an error flag is also set for the sample from the same channel in the vicinity of the erroneous sample. Thus it may be said that the length of interpolation in excess of 6 samples would be useless in view of the increased hardware volume.

The operation of the one-dimensional error concealment circuit is hereinafter explained.

As shown in FIG. 3, the one-dimensional error concealment circuit is supplied with, for example, seven sample data P3, P2, P1, P0, M1, M2, M3 on the same line of the video signals. Error flags FP3, FP2, FP1, FP0, FM1, FM2, FM3, are associated respectively with these sample data. The sample data P0 is the reference sample data to be error concealed, the sample data P1, P2, P3 are the three sample data on the left side of and closer in this order to the sample data P0 and the sample data M1, M2, M3 are the three sample data on the right side of and closer in this order to the sample data P0. The sample data P3, P2, P1, M1, M2, M3 on both sides of the reference sample data P0 are supplied to the variable length interpolating circuit 11 and the replacement circuit 12. The error flags FP3, FP2, FP1, FM1, FM2 and FM3 are supplied to the sample number control circuit 13 and the replacement mode control circuit 14. The reference sample data P0 and the error flags FP0 are supplied to a latch 15 and a selector 16.

In the sample number control circuit 13, the state of the error flags of the plural sample data on both sides of the erroneous sample data P0 to be error concealed are evaluated, and a control signal for weighted mean processing is supplied to the variable-length interpolation circuit 11. In the specific embodiment, shown in FIGS. 2 and 3, the above six error flags FP3, FP2, FP1, FM1, FM2 and FM3 are evaluated, and a control signal for weighted mean processing with the exclusion of the erroneous sample data (with error flag "1") is supplied to the variable length interpolation circuit 11. In the variable length interpolation circuit 11, a weighted mean processing operation is performed with the exclusion of those of the six sample data P3, P2, P1, M1, M2, M3 for which the error flags are "1" indicating an error. In FIG. 33, the mark O indicates an error-free sample data, the mark x indicates the reference sample data being concealed, the mark Δ indicates at least one of the left and right sample data being in error and the mark □ indicates the sample data for which there is no necessity to consider the error state.

FIG. 3a shows the state in which the reference sample data P0 is in error while the six sample data on both sides of the sample data P0 are error-free, that is, the error flags FP3, FP2, FP1, FM1, FM2 and FM3 are "0" indicating no error. A weighted mean is found using the six samples P3 to M3. More specifically, with the weighting coefficients K1, K2 and K3, the weighted mean P is given by $$P = K1 \times (P1+M1) + K2 \times (P2+M2) + K3 \times (P3+M3).$$

FIG. 3b shows the state in which four sample data P2, P1, M1 and M2 on both sides of the reference sample data P0 are error-free, while at least one of the sample data P3 and M3 is in error, that is, the state in which the error flags FP2, FP1, FM1 and FM2 are "0" and at least one of the error flags FP3 or FM3 is "1" indicating an error. At this time, a weighted mean is found using samples P2 to M2 to find the weighted mean P $$P = K1 \times (P1+M1) + K2 \times (P2+M2).$$

FIG. 3c shows the state in which two sample data P1 and M1 on both sides of the sample data in error P0 are error-free and at least one of sample data P2 or M2 is in error, that is the state in which the error flags FP1 and FM1 are "0" and at least one of the error flags FP2 or FM2 is "1". The two samples P1, M1 are used to find the weighted mean P, $$P = K1 \times (P1+M1)$$

The weighted mean P thus obtained at the variable-length interpolating circuit 11 is supplied to the selector 16 shown in FIG. 2.

EXAMPLE OF VARIABLE LENGTH INTERPOLATION

Figures 4, 4A:
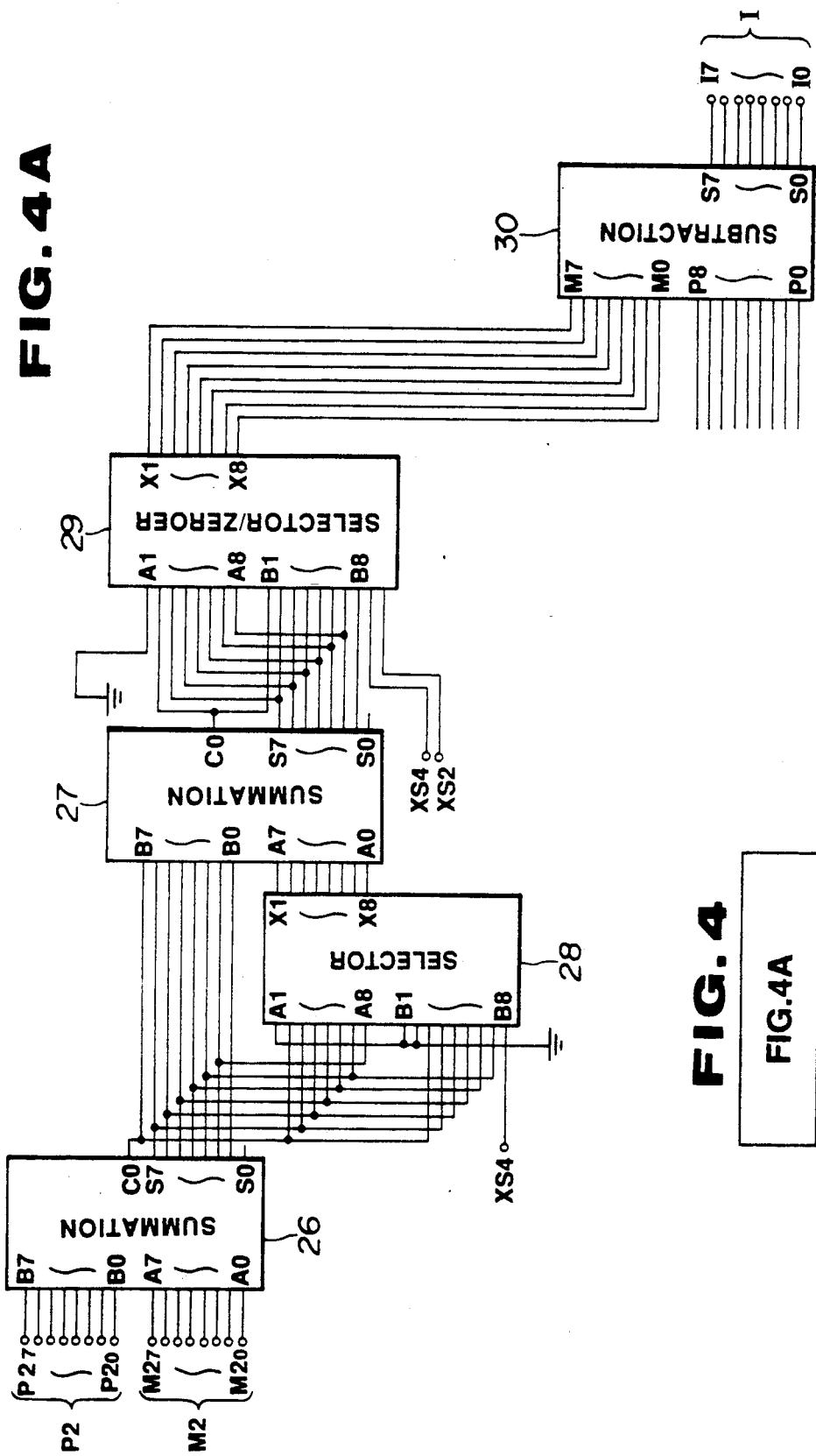
FIG. 4 is a guide for arranging FIGS. 4A and 4B.
FIGS. 4A and 4B together constitute a block circuit diagram showing an embodiment of a variable-length interpolation circuit.
Figure 4B:
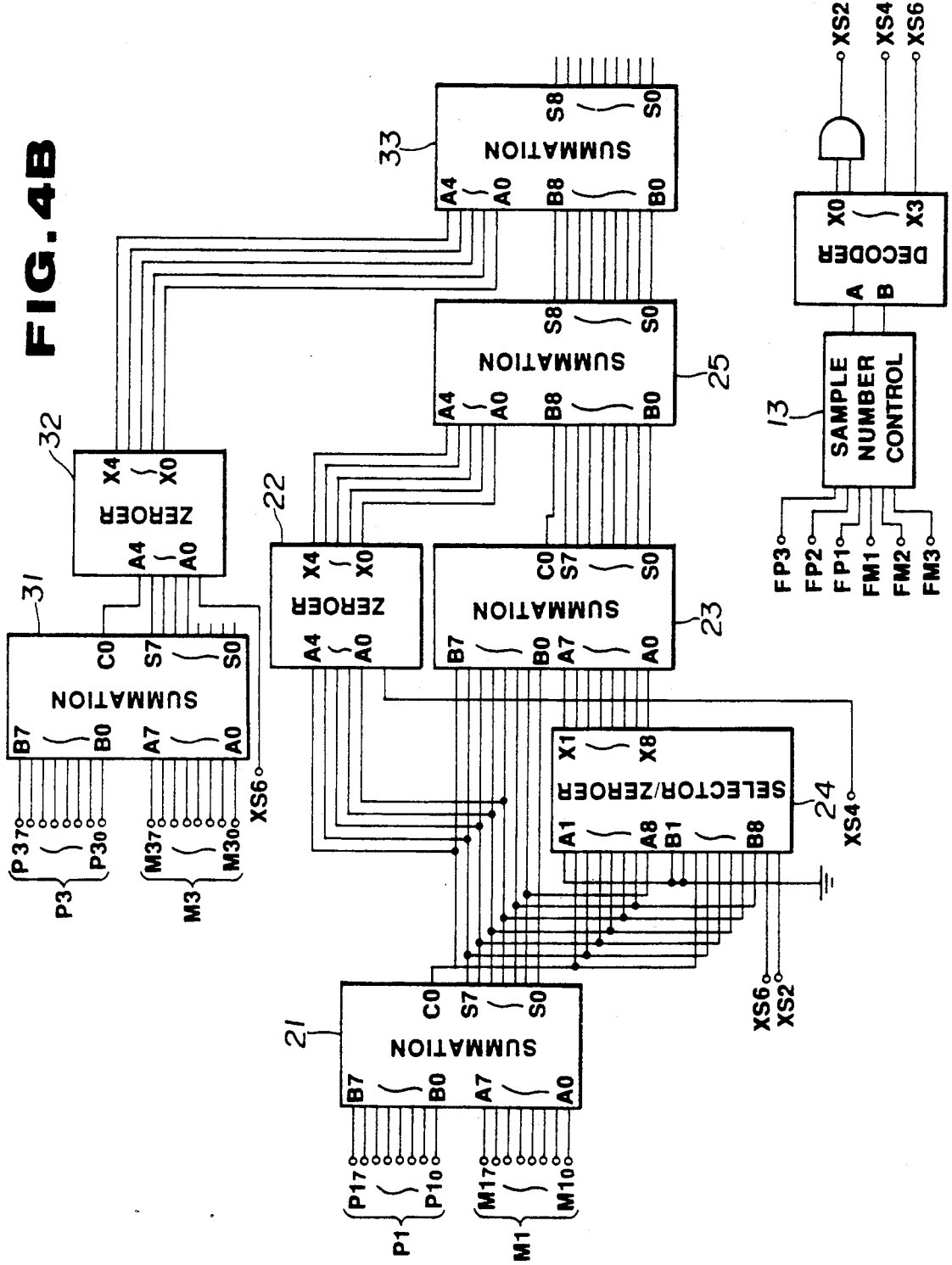

FIG. 4 shows a specific example of the variable length interpolation circuit 11 organized for specific values of the coefficients K1, K2 and K3. In order to promote ease in circuit construction and to reduce the number of component parts required, the following values are used for the coefficients K1, K2 and K3.

(a) For 2 samples $$K1 \tfrac{1}{2} = 0.6, K2 = K3 = 0$$

(b) For 4 samples $$K1 = \tfrac{1}{2} + \tfrac{1}{8} + 1/16 = 0.6875$$

$$K2 = -(\tfrac{1}{8} + \tfrac{1}{4})/4 = -0.1875, K3 = 0$$

(c) For 6 samples $$K1 = \tfrac{1}{2} + \tfrac{1}{4} = 0.75, K2 = -(\tfrac{1}{4} + \tfrac{1}{8})/2 = 0.3125,$$

$$K3 = 1/6 = 0.0625$$

These values of the coefficients are expressed as the sum of powers of 2 and the results of multiplication may be obtained easily by bit shifting and summation at the time of actual digital signal processing.

Referring to FIG. 4, if the sample data of the video signal is an 8-bit word, each bit of each sample data in the drawing is indicated by a suffix from the MSB to the LSB. Thus, with a sample data P1, these bits are indicated as $P1_7$, $P1_6$, $P1_5$, $P1_4$, $P1_3$, $P1_2$, $P1_1$, and $P1_0$. Of the six 8-bit sample data, sample data P1 and M1 are supplied to a summation circuit 21, sample data P2, M2 are supplied to a summation circuit 26 and sample data P3, M3 are supplied to a summation circuit 31. As described hereinabove, the sample number control circuit 13 determines the number of samples used for interpolation, in dependence upon the error flags FP1 to FP3 and FM1 to FM3, and outputs a 2-sample control signal XS2, a 4-sample control signal XS4 and a 6-sample control signal XS6, by way of a decoder or the like.

In the following, it is assumed that the 6-sample control signal XS6 is output, and the weighted mean value $P = (\tfrac{1}{2} + \tfrac{1}{4}) \times (p1 + M1)$
$(\tfrac{1}{4} + \tfrac{1}{8})/2 \times (P2+M2) + 1/16 \times (P3+M3)$ for 6 Samples is to be produced.

Sample data P1 and M1 are summed together at the summation circuit 21. The upper five bits of the sum (P1+M1) are supplied to five bits of a zeroer 22, the upper seven bits of the sum (P1+M1) are supplied to eight bits of a B input of a summation circuit 23, the seven upper order bits of the sum (P1+M1) are supplied to the lower seven bits of an A input of a selector 24 and the upper six bits of the sum (P1+M1) are supplied to the lower six bits of the B input of the selector 24. By such coupling of the summation circuit 21 and the zeroer 22, the output of the summation circuit 21 is shifted by four bits towards the side LSB to be multiplied by $2^{-4}$ or 1/16 to produce a result (P1+M1)/16. Similarly, by coupling the summation circuit 21 with the input B of the summation circuit 23, the output (P1+M1) of the circuit 21 is shifted by one bit towards the side LSB ($\times 2^{-1}$) to produce the result (P1+M1)/2 and, by coupling the circuit 21 to the input A of the selector 24, the sum (P1+M1) is shifted by two bits towards the side LSB to produce the result (P1+M1)/4. Finally, by coupling the circuit 21 to the input B of the selector 24, the sum (P1+M1) is shifted by three bits towards the side LSB ($\times 2^{-3}$) to produce the result (P1+M1)/8.

The zeroer 22 allows data to pass through when selected by the above mentioned 4-sample control signal XS4. For 6-sample operation, the zeroer 22 is not selected, that is, its output is zero, which value is supplied to the input A of a summation circuit 25. The selector 24 becomes valid when selected by the 6-sample control signal XS6 so that the output (P1+M1)/4 of the selector 24 is supplied to the input A of the summation circuit 23. Thus, the output of the circuit 23 is $$(P1+M1)/2+(P1+M1)/4$$

which output is transmitted to the input B of the summation circuit 25. The result (P1+M1)/2+(P1+M1)/4 is output from the summation circuit 25 and transmitted to the input B of a summation circuit 33.

On the other hand, sample data P2, M2 are summed together at the summation circuit 26. The upper eight bits of the sum (P2+M2) are supplied to the eight bits of the input B of a summation circuit 27, the upper seven bits of the sum (P2+M2) are supplied to the lower seven bits of the input A of a selector 28 and the upper six bits of the sum (P2+M2) are supplied to the lower six bits of the input B of the selector 28. In this manner, with the summation circuit 26 connected to the input B of the summation circuit 27, the sum (P2+M2) is shifted by one bit towards the side LSB to produce the result (P2+M2)/2 and, with the summation circuit 26 connected to the input A of the selector 28, the sum (P2+M2) is shifted by two bits towards the side LSB to produce the result (P2+M2)/4. Similarly, with the summation circuit 26 connected to the input B of the selector 28, the sum (P2+M2) is shifted by three bits towards the side LSB to produce the result (P2+M2)/8.

During the 6-sample operation, the input B (P2+M2)/8 of the selector 28 is selected and supplied to the input A of the summation circuit 27. Thus the output of the summation circuit 27 is (P2+M2)/2+(P2+M2)/8. The upper seven bits of the output of the summation circuit 27 are supplied to the lower seven bits of the input A of a selector 29, while the upper eight bits of the output of the summation circuit 27 are supplied to the eight bits of the input B of the selector 29. In this manner, with the summation circuit 27 connected to the input A of the selector 29, the output of the summation circuit 27 is shifted by two bits towards the LSB to find the result of the arithmetic operation ((P2+M2)/2+(P2+M2)/8)/4 and, with the summation circuit 27 connected to the input B of the selector 29, the output of the summation circuit 27 is shifted one bit towards the side LSB to produce the result of the arithmetic operation ((P2+M2)/2+(P2+M2)/8)/2. During the 6-sample operation, the input B of the selector 29 is selected and the output ((P2+M2)/2+(P2+M2)/8)/2 is supplied to the decrementing input M of a subtractor 30.

The sample data P3 and M3 are summed together at the summation circuit 31 and the upper five bits of the (P3+M3) is supplied to the five bits of a zeroer 32. With the summation circuit 31 connected to the zeroer 32, the output of the summation circuit 3 is shifted by four bits towards the side LSB to produce the result of the arithmetic operation (P3+M3)/16. During the 6-sample operation, the output (P3+M3) of the zeroer 32 is supplied to the five bits of the input A of the summation circuit 33, so that the result of the arithmetic operation (P1+M1)/2+(P1+M1)/4+(P3+M3)/16 is obtained at the summation circuit 33. The output (P1+M1)/2+(P1+M1)/4+(P1+M1)/16 of the summation circuit 33 is supplied to a incrementing input P of the subtractor 30, so that the above mentioned weighted mean P is obtained as follows:

$$P = (1/2 + 1/4) \times (P1 + M1) -$$

$$(1/2 + 1/8)/2 \times (P2 + M2) + 1/16 \times (P3 + M3)$$

This interpolation data I(these bits are indicated as I0 to I7) are supplied to the selector 16 shown in FIG. 2.

For 4-sample and 2-sample operations, the weighted mean values P $$P = (1/2 + 1/8 + 1/16) \times (P1 + M1) -$$

$$(1/2 + 1/4)/4 \times (P2 + M2) \text{ (for 4 samples)}$$

$$P = \tfrac{1}{2} \times (P1 + M1) \text{ (for 2 samples)}$$

are produced, respectively, by the variable-length interpolating circuit 11, under control of the sample number control circuit 13.

ONE-DIMENSIONAL REPLACEMENT

The operation of replacement in the replacement section of FIG. 2, including the replacement circuit 12 and the replacement control circuit 14, is hereinafter explained. The replacement operation is performed mainly at the replacement circuit 12 for other than the three error modes shown in FIGS. 3a, 3b and 3c as described above.

The state of the error flags FP1, FM1 is determined in the replacement mode control circuit 14 and, when one of the error flags FP1 or FM1 is "1", indicating an error, the replacement of the erroneous sample data P0 is performed with the use of the error free one of the two sample data P1 and M1. This replacement is referred to as "neighbor replacement".

When both the error flags FP1 and FM1 are "1" (indicating an error) and at least one of the error flags FP2 or FM2 is "0" (indicating no error), replacement of the erroneous sample data P0 is performed using an error-free one of the two sample data P2 and M2. This replacement is referred to as "distant" or "indirect" replacement. When both the error flags FP2 and FM2 are "0" (indicating no error), the sample data P2 is used preferentially.

When the error flag FP2, FP1, FM1 and FM2 are all "1" (indicating an error) and at least one of the error flags FP3 or FM3 is "0" (indicating no error), replacement of the erroneous sample data P0 is performed using the error-free one of the sample data P3 or M3. This is termed as "very distant" or "long-distance" replacement. Meanwhile, when both the error flags FP3 and FM3 are "0" indicating no error, the sample data P3 is used preferentially.

When the error flags FP3, FP2, FP1, FM1, FM2 and FM3 are all "1" indicating an error, the last error-free sample data is used for replacement of the erroneous sample data P0. The last error-free sample data means the stored sample data obtained after sequentially updating one-sample data stored in a latch by the error-free sample data on the same line. This replacement is termed a last good sample replacement.

The sample data after such replacement is supplied to the selector 16. More specifically, three sample data, that is the sample data (weighted mean values) obtained at the variable length interpolation circuit 11, sample data obtained at the replacement circuit 12 and the sample data P0, are supplied to the selector 16 where one of the sample data is selected on the basis of the state of the error flag FP0 and the control signal from the interpolation/replacement control circuit 17 and output at the terminal 18. Thus, when the error flag FP0 is "0" (indicating no error) at the selector 16, the sample data P0 is output. When the error flag FP0 is "1" (indicating an error) and the interpolation is feasible, the above mentioned weighted mean value P (interpolated sample data) from the variable length interpolating circuit 11 is output. If interpolation is not feasible, sample data obtained by replacement from the replacement circuit 12 is output. The output sample data is supplied to the two-dimensional error concealment circuit 112 shown in FIG. 1.

BASIC PRINCIPLE OF TWO-DIMENSIONAL ERROR CONCEALMENT

Figures 5, 6:
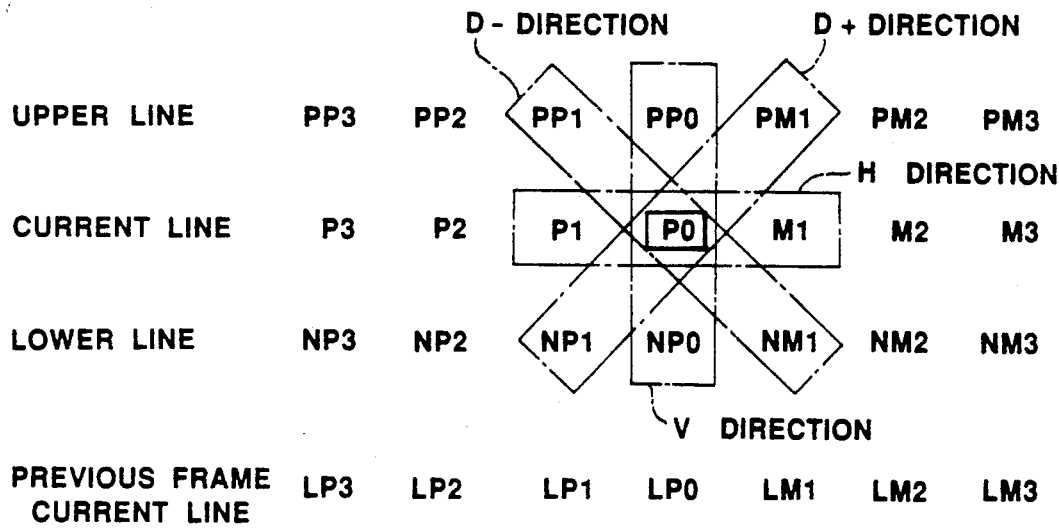
FIG. 5 shows an array of sample data to be processed by two-dimensional error concealment.
FIG. 6 shows an array of error flags for the sample data of FIG. 5.

The basic principle of two-dimensional error concealment is explained by referring to FIGS. 5 and 6.

The two-dimensional error concealment circuit 112 shown in FIG. 1 makes use of video data from the current line, the previous line, the next line, and the corresponding line in the previous frame. By examining this two-dimensional video data, the concealment algorithm tries to find the direction in which the video data is changing most slowly. This ideal direction is the best direction for performing concealment calculations. Possible directions in this algorithm are horizontal, vertical, diagonal minus (negative slope) and diagonal plus (positive slope). The concealment algorithm attempts to rank these possible directions from best to worst. Other two-dimensional concealment operations are performed when an ideal direction cannot be determined, or if the ideal direction concealment calculation is not possible. These concealment operations are various kinds of interpolation and replacement.

FIG. 5 shows sample data supplied from the one-dimensional error concealment circuit 111, line delay circuits 113, 114, and the frame delay circuit 115 of FIG. 1 to the two-dimensional concealment circuit 112. FIG. 6 shows error flags associated with these sample data.

Referring to FIG. 5, with the reference sample data P0 to be concealed for error, three sample data each on the left and right sides of the reference sample data P0 on the same line, that is, the current line, are indicated by P3, P2, P1, M1, M2, M3. In association with these seven sample data, sample data on the previous line or upper line are referred to as PP3, PP2, PP1, PP0, PM1, PM2 and PM3, while sample data on the next line or lower line are referred to as NP3, NP2, NP1, NP0, NM1, NM2 and NM3 and sample data on a line of a previous frame corresponding to the current line are indicated by LP3, LP2, LP1, LP0, LM1, LM2 and LM3. The range shown in FIG. 5 is termed a concealment window, which includes all of the sample points handled during the arithmetic operation for concealment. Referring to FIG. 6, the error flag associated with the sample data P0 is FP0 while the error flags associated with the sample data P3 to P1, M1 to M3, PP3 to PM3, NP3 to NM3 and LP3 to LM3 are termed FP3 to FP1, FM1 to FM3, FPP3 to FPM3, FNP3 to FNM3 and FLP3 to FLM3, respectively.

For error concealment of the reference sample data P0, where the error concealment direction is the horizontal or H direction, the sample data in use are at least P1 and M1 and, for variable-length interpolation, the sample data used are P3, P2, P1, M1, M2 and M3. If the error concealment direction is the vertical or V direction, the sample data used are PP0 and NP0. Similarly, if the concealment direction is diagonal minus (D−) or diagonal plus (D+), the sample data used are PP1 and NM1 or PM1 and NP1, respectively. The above applies for both interpolation and replacement. Other methods of replacement include replacement with an error-free sample data of the preceding frame or field showing high temporal correlation or replacement with previously error concealed sample data.

For determining the direction for the above described interpolation or replacement, concealment errors (conversely, concealment accuracy) in plural different directions are found using sample data in the vicinity of the reference sample data to be concealed and the concealment errors in the respective directions are compared to find the best concealment direction which will minimize the concealment error. The ranking control circuit is provided for finding the concealment error or accuracy in each of the error concealment directions and ranking the error concealment directions in the order of preference.

Thus the two-dimensional error concealment circuit 112 shown in FIG. 1 includes the ranking control circuit 117 for selecting the ideal concealment direction for use in error concealment.

RANKING CONTROL CIRCUIT

Figure 7:
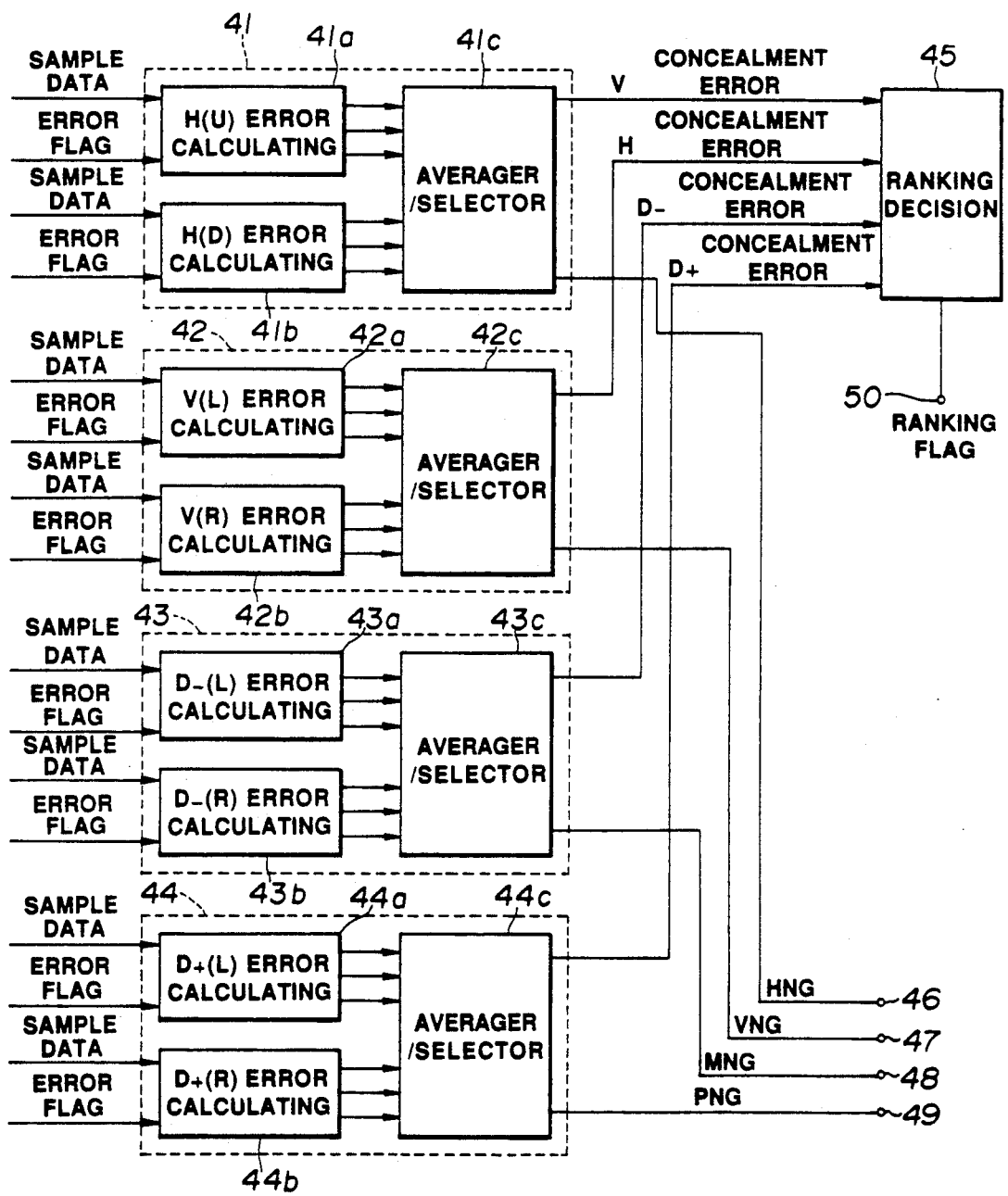
FIG. 7 is a block circuit diagram of a ranking control circuit for two-dimensional error concealment.

FIG. 7 is a block circuit diagram showing an example of the ranking control circuit 117.

In FIG. 7, an H concealment accuracy output circuit 41 functions to predict the accuracy of error concealment in the H or horizontal direction on the basis of the concealment error in the H direction in the vicinity of the reference sample data P0 to be concealed due to error. Thus the circuit 41 includes a horizontal up or H(U) error calculating circuit 41a for calculating upper side concealment error using sample data on the line above the reference sample data, a horizontal down or H(D) error calculating circuit 41b for calculating lower side concealment error using sample data on the line below the reference sample data, and an averager/selector circuit 41c for calculating an average value of the output of the H(U) error calculating circuit 41a and the output of the H(D) error calculating circuit 41b.

The H(U) error calculating circuit 41a is supplied with sample data PP3, PP2, PP1, PP0 and PM1, PM2, PM3 on the line above the reference data sample P0 and the corresponding error flags FPP3, FPP2, FPP1, FPP0, FPM1, FPM2, FPM3. Circuit 41a produces a first or upper side concealment error in the H direction where the error flags allow six-sample interpolation as follows $$|PP0-(0.75(PP1+PM1)-0.3125(PP2+PM2)+0.0625(PP3+PM3))|$$

Other interpolation equations are used if the error flags permit only two-sample or four-sample interpolation (as described above in the section titled "EXAMPLE OF VARIABLE LENGTH INTERPOLATION"). On the other hand, the H(D) error calculating circuit 41b is supplied with sample data NP3, NP2, NP1, NP0, NM1, NM2, NM3 on the line below the reference sample data P0 and the corresponding error flags FNP3, FNP2, FNP1, FNP0, FNM1, FNM2, FNM3 and produces a second or lower side concealment error in the H direction (for the six-sample interpolation case)

$$|NP0-(0.75(NP1+NM1)-0.3125(NP2+NM2)+0.0625(NP3+NM3))|$$

which it supplies to the averager/selector circuit 41c where an average value of the upper and lower side concealment errors in the H direction is computed. That is, the concealment error E(H) in the H direction (for the six-sample interpolation case) is produced as follows:

$$E(H) = (|PP0 - (0.75(PP1 + PM1) - 0.3125(PP2 + PM2) + 0.0625(PP3 + PM3))| + |NP0 - (0.75(NP1 + NM1) - 0.3125(NP2 + NM2) + 0.0625(NP3 + NM3))|)/2$$

The concealment error E(H) in the H direction thus obtained is transmitted to a ranking decision circuit 45.

Meanwhile, if variable length interpolation is not possible due to the state of the error flags of the sample data used to determine the upper side concealment error in the H direction (for example, the error flag FPP1 for sample data PP1, is "1", indicating an error), the concealment error E(H) in the H direction may be determined solely with the use of the lower side concealment error, such that $$E(H) = |NP0-(0.75(NP1+NM1)-0.3125(NP2+NM2)+0.0625(NP3+NM3))|.$$

For the concealment error E(H) in the H direction, a concealment error for variable-length interpolation using a weighted mean value for up to 6 samples at a maximum may be found, as in the aforementioned specific example of one-dimensional error concealment.

An invalid signal (NG signal) is employed, which shows that the arithmetic operation for finding the concealment error cannot be performed due to the states of the error flags of the sample data used for calculating the concealment error in the H direction. That is, when the error flag of one of sample data employed for calculating the upper side concealment error in the H direction, such as error flag FPP1 for PP1, and an error flag for one of the sample data employed for calculating the lower side concealment error in the H direction, such as error flag FNP1 for NP1, are both "1" indicating an error, it becomes impossible to compute the concealment error E(H) in the H-direction. At this time, the invalid signal HNG for the H direction is output and transmitted via output terminal 46 to the main part of the two-dimensional error concealment circuit, as later described, so that the H direction is no longer considered in determining the ideal direction for two-dimensional error concealment.

In the present illustrative embodiment, the first and second side concealment errors in the H direction are compared with a predetermined threshold value T. When at least one of the concealment errors is determined to be above the threshold value T as a result of this comparison, the invalid signal HNG in the H direction is output, so that the H direction is not deemed to be an ideal direction. Since the concealment error at a vicinal position is used to predict the concealment error at the concealed point, the threshold value T enforces a maximum value of the predicted concealment error.

The threshold T may be made variable so that it can be set externally. When the value of the threshold T is reduced, the ideal direction for two-dimensional error concealment may be determined with a higher accuracy, but the error concealment direction may not be determinable for some data samples. Conversely, when the value of the threshold T is increased, the error concealment direction in many positions can be determined only with poor accuracy.

A vertical (V) concealment accuracy output circuit 42 functions to predict the accuracy of error concealment in the vertical or V direction on the basis of the concealment error in the V direction in the vicinity of the reference sample data P0. Thus the circuit 42 includes a vertical left or V(L) error calculating circuit 42a for calculating a left side concealment error using the sample data P1 on the left side of the reference sample data P0 and sample data PP1 and NP1 above and below the sample data P1, a vertical right or V(R) error calculating circuit 42b for calculating a right side concealment error using the sample data M1 on the right side of the reference sample data P0 and sample data PM1 and NM1 above and below the sample data M1, and an averager/selector circuit 42c for calculating an average value of the outputs of the circuits 42a and 42b.

Thus, in the V(L) error calculating circuit 42a, V(R) error calculating circuit 42b and the averager/selector circuit 42c, the concealment error E(V)

$$E(V) = (|P1-(PP1+NP1)/2| + |M1-(PM1+NM1)/2|)/2$$

is found on the basis of the first or left side concealment error in the V direction $$|P1-(PP1+NP1)/2|$$

and the second or right side concealment error in the V direction.

$$|M1-(PM1+NM1)|/2$$

If one of the right or left side concealment errors cannot be calculated, then the concealment error is that determined for the other side. This concealment error E(V) in the V direction is supplied to the ranking decision circuit 45. When the concealment error cannot be computed, the invalid signal VNG for the V direction is output via output terminal 47, as in the case of determining the concealment error in the H direction. It is also determined if the first and the second side concealment errors are larger than the predetermined threshold T. If the errors are larger than the threshold value, the invalid signal VNG is output, so that the V direction is discarded from consideration in determining the ideal direction for two-dimensional error concealment.

The D_ concealment accuracy output circuit 43 functions to predict the accuracy of error concealment in the D_ direction, that is, the diagonal minus or negative slope on the basis of the concealment error in the D_ direction in the vicinity of the erroneous sample data. Thus the circuit 43 includes a diagonal minus left or D_(L) error calculating circuit 43a for calculating a first side concealment error using sample data P1 on the left side of the reference sample data P0 and sample data PP2, NP0 on both ends of the negative diagonal line passing through the sample data P1, a diagonal minus right or D_(R) error calculating circuit 43b for calculating a second side concealment error using the sample data M1 on the right side of the sample data P0 and sample data PP0, NM2 on both ends of a negative diagonal line passing through the sample data M1, and an averager/selector circuit 43c for calculating the average value of the output of the D_(L) error calculating circuit 43a and the D_(R) error calculating circuit 43b.

That is, in the D_(L) error calculating circuit 43a, D_(R) error calculating circuit 43b and the average value/selector circuit 43c, a first side concealment error in the D_ direction $$|P1-(PP2+NP0)/2|$$

a second side concealment error in the D_ direction $$|M1-(PP0+NM2)/2|$$

and a concealment error E(D_) in the D_ direction $$E(-D_-)=(|P1-(PP2+NP0)/2|+|M1-(PP0+NM2)/-2|)/2$$

are found. The concealment error E(D_) in the D_ direction is supplied to the ranking decision circuit 45. If one of the first or second side concealment errors cannot be calculated, then the concealment error is the calculable concealment error obtained for the other side. Meanwhile, if the concealment error E(D_) in the D_ direction cannot be computed or the first and second side concealment errors are larger than the predetermined threshold T, an invalid signal MNG in the D_ direction (wherein M stands for diagonal "minus") is output via output terminal 48, so that the D_ direction is discarded from consideration in determining the ideal direction for two-dimensional error concealment.

The D+ concealment accuracy output circuit 44 functions to predict error concealment accuracy in the D+ direction, that is, diagonal plus or positive direction on the basis of the concealment error in the D+ direction in the vicinity of the reference sample data P0. Thus the circuit 44 includes a diagonal plus left or D+(L) error calculating circuit 44 for calculating a first side concealment error using the sample data P1 on the left side of the reference sample data P0 and sample data PP0, NP2 on both ends of a positive diagonal line passing through the sample data P1, a diagonal plus right or D+(R) error calculating circuit 44b for calculating a second side concealment error using the sample data M1 on the right side of the sample data P0 and sample data PM2, NP0 on both ends of a positive diagonal line passing through the sample data M1, and an averager/selector circuit 44c for calculating an average value of the outputs of the D+(L) error calculating circuit 44a and the D+(R) error calculating circuit 44b.

That is, in the D+(L) error calculating circuit 44a, D+(R) error calculating circuit 44b and the averager/selector circuit 44c, a first side concealment error in the D+ direction $$|P1-(PP0+NP2)/2|$$

a second side concealment error in the D. direction $$|M1-(PM2+NP0)/2|$$

and a concealment error E(D+) in the D+ direction $$E(D_-)=(|P1-(PP0+NP2)/2|+|M1-(PM2+NP0)/-2|)/2$$

are determined. The concealment error $E(D_+)$ in the $D_-$ direction is supplied to the ranking decision circuit 45. If one of the first or second side concealment errors cannot be calculated, then the concealment error is the calculable concealment error obtained for the other side. Meanwhile, if the concealment error $E(D_+)$ in the $D_+$ direction cannot be computed or the first and second side concealment errors are larger than the predetermined threshold T, an invalid signal PNG in the $D_+$ direction, wherein P stands for diagonal "plus", is output via output terminal 49, so that the $D_+$ direction is discarded from consideration in determining the ideal direction for the two-dimensional error concealment.

Then, in the ranking decision circuit 45, the remaining concealment errors $E(H)$, $E(V)$, $E(D_-)$ and $E(D_+)$ for directions which have not been excluded, are compared to each other and the concealment direction ranking (sequence of preference) is determined in the order of increasing magnitude, i.e. the direction with the smallest error has the highest preference. If the concealment error values in the respective directions are equal, preference is in the order of H direction, V direction, $D_-$ direction and $D_+$ direction. The ranking flags (plural bits) from the ranking decision circuit 45 are supplied to the main part of the two-dimensional error concealment circuit as later described.

Meanwhile, the arithmetic operation for concealment cannot always be executed in any desired direction, as a function of the status of the error flags. The direction effectively selected as the ideal direction means a direction for which the error flags permit an actual arithmetic concealment operation and which has the highest ranking.

The ranking of the ideal direction is computed using luminance sample data. This is because the luminance data has broader bandwidth and thus more detail than the chrominance data. The error flag states for luminance and chromiance are examined separately. Because of the error flags, the selection of the highest ranking direction in which the calculation for actual concealment may be executed is independent so that the direction of actual luminance concealment may differ from the direction of actual chrominance concealment.

SPECIFIC EXAMPLE OF RANKING CONTROL

Figure 8C:
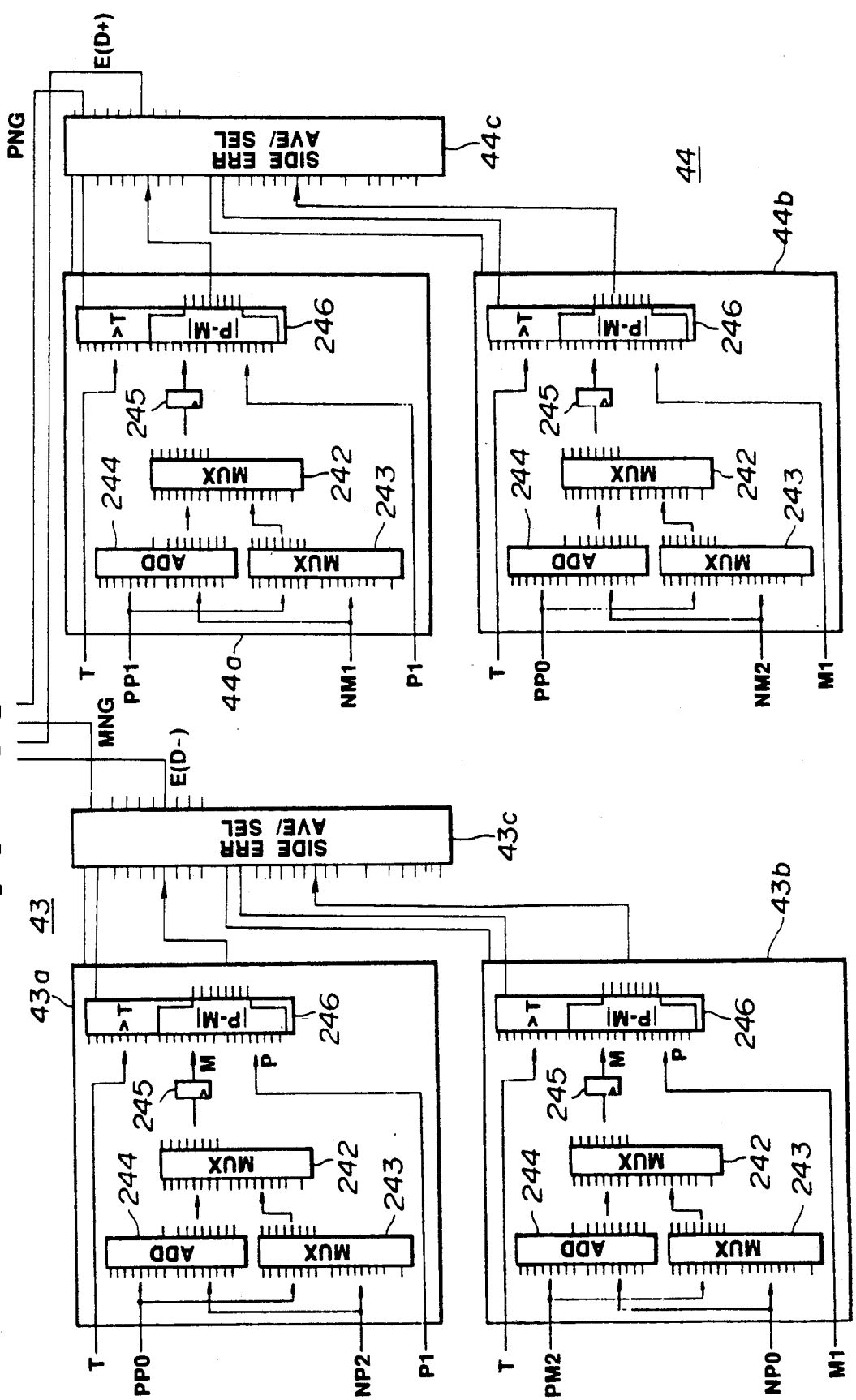

Although the operation of determining the ideal direction of interpolation has been largely explained in the foregoing, the ideal direction may be determined in the case of replacement by ranking the directions from which replacement data samples may be selected. Interpolation in the horizontal direction may be a variable length interpolation using up to six samples as explained in the foregoing. A more specific example of ranking control with the above taken into account will be explained by referring to FIG. 8.

In this figure, the H concealment accuracy generation circuit 41 is adapted to determine the concealment error while performing variable-length interpolation using up to a maximum of 6 samples. An H(U) error computing circuit 41a in this H concealment accuracy output circuit 41 computes a concealment error using sample data on a line above the line of the reference sample data P0. The H(U) error calculating circuit 41a, includes a variable length interpolation circuit 241 for executing the above mentioned variable-length interpolation function on the basis of the six sample data PP3, PP2, PP1, PM1, PM2 and PM3. When six samples are available, the variable-length interpolation circuit 241 produces an interpolated value $PP0_{INT}$ as follows:

$$PP0_{INT} = K1 \times (PP1 + PM1) + K2 \times (PP2 + PM2) + K3 \times (PP3 + PM3)$$

so that $PP0_{INT}$ is a weighted mean value of six samples. With four or two available samples, the interpolated value $PP0_{INT}$ is found using the respective formulae described above. The interpolated values thus found by the variable length interpolating circuit 241 are transmitted to an interpolation/replacement selector 242. Substitution data obtained from the H direction provided by a replacement circuit 243 are supplied to the interpolation/replacement selector 242. Vicinal sample data PP1 and PM1 on the upper line are supplied to the replacement circuit 243. One of these sample data is selected and transmitted to the selector 242. The selector 242 is switched to output one of the replacement data or the variable-length interpolation data depending upon whether the error flags prohibit or allow interpolation with the use of the upper line data, as will be described. The data output by the interpolation/replacement selector 242 are transmitted via a timing latch 245 to a subtractor/comparator 246. The subtractor/comparator 246 provides the difference between the output from the latch 245 and the reference sample data PP0 on the upper line as the upper line concealment error, while determining whether the upper line concealment error exceeds the threshold T and outputting the result of this determination. The H(U) error calculating circuit 41a outputs a signal indicating infeasibility of the interpolation or replacement making use of the neighboring sample data on the upper line and transmits the signal to the averager/selector circuit 41c simultaneously with the upper line concealment error and the result of the threshold comparison determination. The sample data supplied to the H concealment accuracy output circuit 41 are shown in FIG. 5 for simplifying the description. Considering that a one-sample delay is caused by the latch 245, it is necessary for the actually input sample data PP0 or NP0 to be delayed one sample with respect to the data output by latch 245.

The H(D) error calculating circuit 41b in the H concealment accuracy output circuit 41 computes the lower line concealment error using sample data on the line below the line of the reference sample data P0 and the associated error flag and has a similar construction to that of the H(U) error calculating circuit 41a. The variable length interpolation circuit 241 within the H(D) error calculating circuit 41b executes a variable length interpolating operation on the basis of the six sample data NP3, NP2, NP1, NM1, NM2 and NM3 on the line below the reference data sample P0. Within the H(D) error calculating circuit 41b, there are also provided an interpolation/replacement selector 242, replacement circuit 243, latch 245 and the subtractor/comparator 246, which operate in the same manner as the corresponding circuits in the H(U) error calculating circuit 41a except that it processes data different from that processed in the latter circuit. The lower line concealment error and the result of the comparison with the threshold T, as well as the above mentioned infeasibility signal from the subtractor/comparator 246 of the H(D) error calculating circuit 41b are transmitted to the averager/selector circuit 41c.

The averager/selector circuit 41c takes the average value of the one-side concealment error from the H(U) error calculating circuit 41a and the one-side concealment error from the H(D) error calculating circuit 41b to output the above mentioned H direction concealment error, while outputting at H direction invalid signal HNG for excluding the H direction from ideal direction ranking depending upon the result of the threshold comparison and each infeasibility signal.

Since a 2-sample interpolation or so-called mean value interpolation is performed in the concealment accuracy output circuits 42 to 44, instead of variable length interpolation, a summation circuit 244 for calculating the average value is provided in each of the error calculating circuits 42a, 42b, 43a, 43b, 44a and 44b.

The V(L) error calculating circuit 42a of the V concealment accuracy output circuit 42 computes left side concealment error, using the sample data P1 on the left side of the reference sample data P0 and sample data PP1, NP1 above and below the sample data P1. Thus the sample data PP1, NP1 are supplied to the summation circuit 244 in the V(L) error calculating circuit 42a to be summed together and the resulting sum is supplied to an interpolation/replacement selector 242 after shifting one bit. The error calculating circuit 42a is otherwise similar in construction and operation to the above mentioned H(U) error calculating circuit 41a and the H(D) error calculating circuit 41b. Thus, replacement data from the replacement circuit 243 (the left side sample data PP1 or NP1) are transmitted to the interpolation/replacement selector 242 and one of the interpolation data and the replacement data is selected and output depending upon whether the error flags allow or prohibit interpolation of the left side data. The output data from the selector 242 are supplied via timing latch 245 to the subtractor/comparator 246, where the difference thereof with the left side sample data P1 is obtained and output as the left side concealment error. The subtractor/comparator 246 also outputs the result of a determination whether the left side concealment error exceeds the threshold value T. The V(L) error calculating circuit 42a also outputs the above mentioned infeasibility signal and these signals are supplied to the averager/selector circuit 42c.

The remaining error calculating circuits 42b, 43a, 43b, 44a, 44b include a summation circuit 244, an interpolation/replacement selector 242, a replacement circuit 243, a latch 245 and a subtractor/comparator 246, which function similarly to the corresponding circuits in the V(L) error calculating circuit 42a but which process different data from that processed in the latter circuit. In a manner similar to that of the averager/selector circuit 41c, the averager/selector circuit 42c takes the means value of the left side concealment error from the V(L) error calculating circuit 42a and the right side concealment error from the V(R) error calculating circuit 42b and outputs the above mentioned V-direction concealment error E(V), while outputting the V-direction invalid signal VNG which will serve to exclude the V direction from ideal direction ranking. Similarly, the averager/selector circuit 43c outputs a $D_-$ direction concealment error $E(D_-)$ and a $D_-$ direction invalid signal MNG, while the averager/selector circuit 44c outputs a $D_+$ direction concealment error $E(D_+)$ and a $D_+$ direction invalid signal PNG.

The ranking decision circuit 45 includes six comparators 251 to 256 for comparing the magnitudes of the concealment errors $E(H)$, $E(V)$, $E(D_-)$ and $E(D_+)$ in the above four directions. By these comparators 251 to 256, the relative magnitudes.

$E(H) > E(V)$, $E(H) > E(D_-)$ $E(H) > E(D_+)$, $E(V) > E(D_-)$ $E(V) > E(D_-)$, $E(D_-) > E(D_+)$.

are examined to check the relative magnitudes of the concealment errors in each of the above four directions. The comparison outputs $E(H) > E(V)$ to $E(D_-) > E(D_+)$ are expressed as HGV, HGM, HGP, VGM, VGP and MGP, respectively, wherein M and P denote the diagonal "minus" ($D_-$) and the diagonal "plus" ($D_+$), respectively.

The outputs HGV to MGP from the ranking decision circuit 45 are output via latch 259 and correspond to the ranking flags output from the output terminal 50 shown in FIG. 7. The invalid signals HNG, VNG, MNG and PNG in the above four directions are output via latch 249 at the output terminals 46, 47, 48 and 49, respectively. It noted that the error concealment need be performed in a subsequent stage since the output data are delayed each by one sample by these latches 259, 249.

MAIN PART OF TWO-DIMENSIONAL CONCEALMENT CIRCUIT

Figure 9:
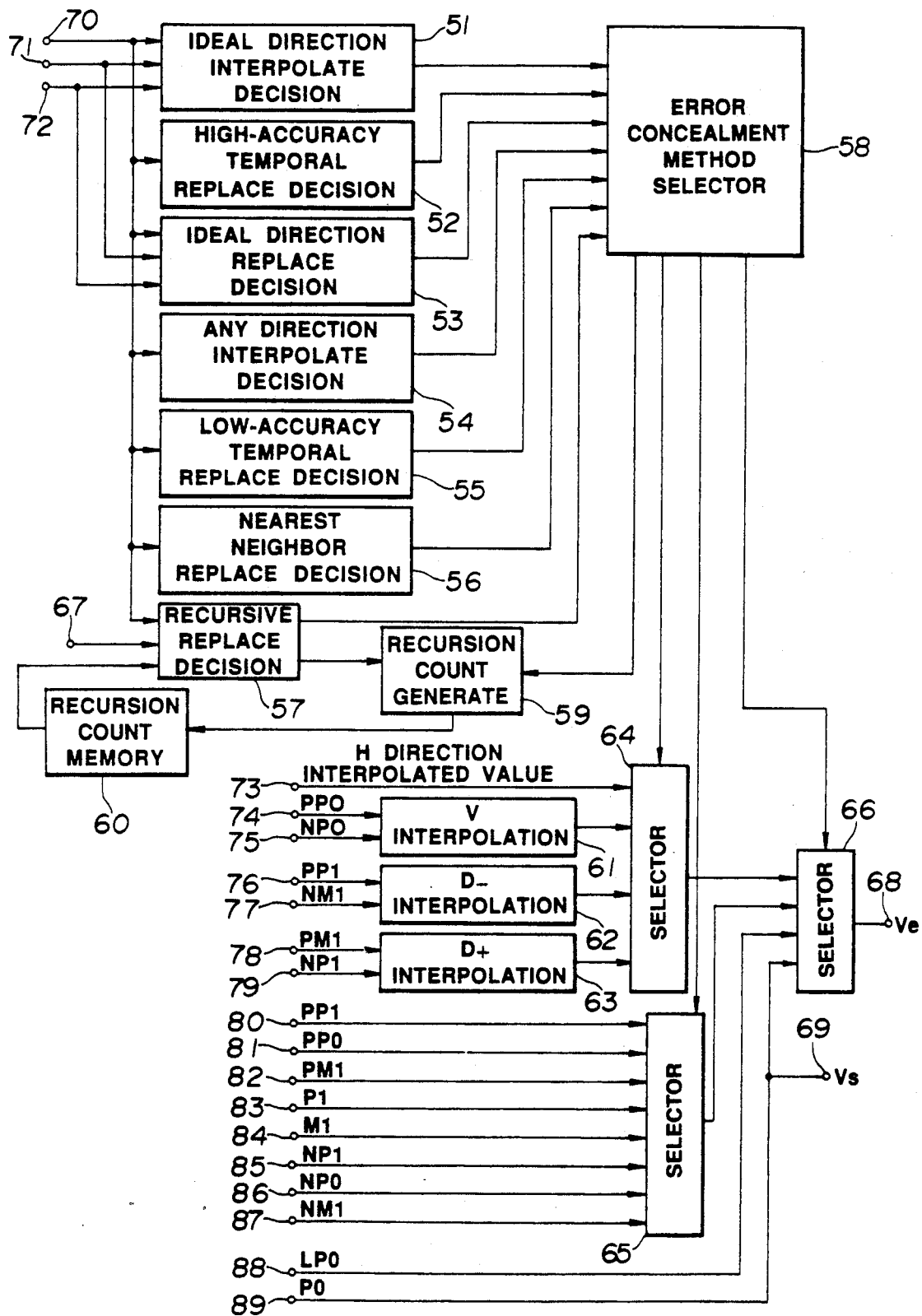
FIG. 9 is a block circuit diagram showing a main part of an embodiment of a two-dimensional error concealment circuit.

In the circuitry of FIG. 9, error flags in the vicinity of the reference sample points, such as FPP1, FPP0, FPM1, FP1, FM1, FNP1, FNP0 or FNM1, are supplied to the input terminal 70, while the ranking flags obtained by the above mentioned ideal direction ranking and feasibility signals for the various directions are supplied to the input terminals 71 and 72. All of these error flags, ranking flags and feasibility signals are supplied, to the ideal direction interpolation decision circuit 51 and the ideal direction replacement decision circuit 53 which determine the error states in the vicinity of the reference erroneous sample data P0 with the aid of these data to determine the method of error concealment in the ideal concealment direction. The interpolation data at the error-concealed reference sample point from the one-dimensional concealment circuit 111, that is the variable-length data in the horizontal direction, are transmitted to the input terminal 73, while the sample data PP0, NP0, PP1, NM1, PM1 and NP1 for interpolation in the V, $D_-$ and $D_+$ directions are transmitted to the input terminals 74 to 79. Eight sample data PP1, PP0, PM1, P1, M1, NP1, NP0 and NM1 in the vicinity of the reference sample for replacement in the H, V, $D_-$ and $D_+$ directions, are transmitted to the input terminals 80 to 87, respectively. Sample data LP0 of a point of a preceding frame corresponding to the reference sample point is supplied to the input terminal 88, while the reference sample data P0 to be concealed for error is supplied to the input terminal 89.

The circuitry of FIG. 9 may be roughly divided into various sections. These are a section performing an interpolation using error-free sample data in the vicinity of the reference sample point, input via terminals 73 to 79, constituted by ideal direction interpolation decision circuit 51, optional interpolating direction (any direction interpolation) decision circuit 54, error concealment method selector 58, interpolation circuits 61 to 63 and selectors 64, 66; a section performing a replacement using error-free sample data in the vicinity of the reference sample point, input via terminals 80 to 87. constituted by ideal direction replacement decision circuit 53, nearest neighbor replacement decision circuit 56, error concealment method selector 58 and selectors 65, 66; a section performing temporal replacement using error-free sample data of the previous frame, input via terminal 88, constituted by high accuracy temporal replacement decision circuit 52, low accuracy temporal replacement decision circuit 55, error concealment method selector 58 and selector 66, and a section performing a replacement using error-concealed sample data, constituted by recursive replacement decision circuit 57, recursive count generator 59, recursive count memory 60, error concealment method selector 58 and selectors 65, 66.

With the use of the main part of the two-dimensional concealment circuit, that one of the concealment strategies or algorithms shown in Table I is selected which is calculable and which is highest in ranking or sequence of preference,

TABLE 1

| error concealment method | concealment window |
| --- | --- |
| Ideal Direction Interpolation | 5–76% |
| High-Accuracy Temporal Replacement | 7% |
| Ideal Direction Replacement | 10–81% |
| Any Direction Interpolation | 8–85% |
| Low Accuracy Temporal Replacement | 21–64% |
| Nearest Neighbor Replacement | 9–91% |
| Recursive Replacement | 97% max. |
| Default Temporal Replacement | 100% |

In Table 1 above, the concealment strategies and the instantaneous error rates are tabulated in the order of decreasing preference ranking. The error rates indicate the range of applicability of the corresponding error concealment method, and demonstrate that several error concealment methods may be applicable for a given rate. FIG. 9 arranges, in the order listed in Table 1, the ideal direction decision interpolation circuit 51, high accuracy temporal replacement decision circuit 52, ideal direction replacement decision circuit 53, any direction interpolation decision circuit 54, low accuracy temporal replacement decision circuit 55, nearest neighbor replacement decision circuit 56 and a recursive replacement decision circuit 57.

The error rates shown in Table 1 are not used in selecting the error concealment method. Rather, it is the state of the error flags (error patterns) in the vicinity of the reference sample data P0 and the video data contents that determine the particular error concealment method selected. However, an accurate strategy is used mostly for low error rates. This preference system permits so-called modeless concealment. This is, the best error concealment method is always selected for the current error pattern without dependence upon the current reproduction mode. The instantaneous error rate of Table 1 shows the minimum and maximum values of the error rate permitting the use of each of the concealment strategies. The actual error rate at which each strategy is used depends appreciably on the error flag pattern at each point to be concealed.

The selection of the concealment strategy depends on the computation feasibility of a variety of strategies. If an interpolation operation in a given direction can be computed, that direction can be interpolated. Similarly, if a replacement sample in a given direction is valid, that direction can be used in substitution.

The above mentioned error concealment methods, namely the concealment strategies and formulae are hereinafter explained.

IDEAL DIRECTION INTERPOLATION, IDEAL DIRECTION REPLACEMENT, ANY DIRECTION INTERPOLATION AND NEAR NEIGHBOR REPLACEMENT

First, ideal direction interpolation is explained.

The ideal interpolate direction decision circuit 51 of FIG. 9 is supplied with error flags FPP1, FPP0, FPM1, FP1, FM1, FNP1, FNP0 and FNM1, associated with sample data in the vicinity of the reference erroneous sample data P0, ranking flags from the ranking control circuit, such as the above mentioned comparison output signals HGV, HGM, HGP, VGM, VGP and MGP, and with the above mentioned invalid signals HNG, VNG, MGN and PNG, indicating the computation feasibility in the various directions. The ideal interpolate direction decision circuit 51 examines the state of these error flags, ranking flags and invalid signals to determine the ideal interpolation direction and transmits a control signal to the error concealment method selector 58. More specifically, ideal direction interpolation becomes feasible when, for a given direction, the invalid signal is set (meaning that the computed concealment error is not more that the threshold T) and the error flags allow the actual interpolation. The direction with the highest ranking smallest calculated concealment error) is selected. Thus inappropriate directions are excluded by the above invalid signals and error flags, and the direction of the highest preference is determined on the basis of the ranking flags. A control signal indicating this direction of the highest preference is supplied to the error concealment method selector 58.

From the error concealment method selector 58, the selection control signal for selecting the ideal direction interpolation data is transmitted to the selectors 64, 66. At this time, one of the interpolated sample data for the above mentioned four directions is selected at the selector 64. That is, the weighted mean value in the H direction, or the variable-length interpolated data, already computed at the above mentioned one-dimensional error concealment circuit via terminal 73, is supplied to the selector 64. On the other hand, sample data PP0, NP0 above and below the sample data to be interpolated are supplied via terminals 74, 75 to a V interpolation circuit 61 where the above mentioned interpolated value in the V direction $((PP0+NP0)/2)$ is formed and transmitted to the selector 64. Sample data PP1, NM1 on a diagonal minus of the sample data P0 to be interpolated are supplied via terminals 76, 77 to a $D_-$ interpolation circuit 62 where an interpolated value in the $D_-$ direction $((PP1+NM1)/2)$ is formed and transmitted to the selector 64. Sample data PM1, NP1 on the diagonal plus of the sample data P0 to be interpolated are supplied via terminals 78, 79 to a $D_+$ interpolating circuit 63 where the interpolated value in the $D_+$ direction $((PM1+NP1)/2)$ is formed and transmitted to the selector 64. The above mentioned interpolated values in the various directions are supplied to the selector 64 where the interpolated value of the direction chosen by the ideal interpolating direction decision circuit 58, i.e., the direction possessing minimum concealment error is selected by the control signal from the error concealment method selector 58 and transmitted to the selector 66. If the above mentioned ideal direction interpolation is feasible, the selector 66 selects output data from the selector 64 and transmits the data to the terminal 68.

If this ideal direction interpolation is not feasible, the ideal interpolation method is not selected and the high accuracy temporal replacement method with the next highest preference ranking is selected if it is usable.

Ideal direction replacement is now explained.

The ideal replacement direction decision circuit 53 is supplied with error flags FPP1, FPP0, FPM1, FP1, FM1, FNP1, FNP0 and FNM1, ranking flags from the ranking circuit and calculable feasibility signals for the various directions and examines these error flags, ranking flags and invalid states to determine the ideal replacement direction. More specifically, any of the above mentioned H direction, V direction, D_ direction or D_+ direction which are considered to be inappropriate on the basis of the invalid signals and the error flags are eliminated, and the direction having the highest preference is determined on the basis of the ranking flags for the remaining directions. The control signal indicating the direction having the highest preference is supplied to the error concealment method selector 58.

When the ideal replacement direction is selected at the error concealment direction 58, the selectors 65, 66 are controlled so that sample data having the direction determined by the ideal replacement direction decision circuit 53, from the sample data PP1, PP0, PM1, P1, M1, NP1, NP0 and NM1 input via terminals 80 to 87, that is, the minimum concealment error direction, is transmitted via selectors 65, 66 to the terminal 68.

The any direction interpolation method is now explained.

Error flags FPP1, FPP0, FPM1, FP1, FM1, FNP1, FNP0 and FNM1 are supplied to the any direction interpolation decision circuit 54 where the state of these error flags is determined. Thus, a direction in which interpolation is possible (i.e. having a "0" error flag on both sides, indicating no error) is selected and a control signal indicating that interpolation in such direction is feasible is transmitted to the error concealment method selector 58. When plural directions are possible, the preference ranking is set in the order of H direction, V direction, D_+ direction and D_ direction.

When any direction interpolation is selected by the error concealment method selector 58, the selectors 64, 66 provide an interpolation value P at the the terminal 68 chosen from the interpolation values for the various directions input to the selector 64, as determined by the any direction interpolation decision circuit 54.

Nearest neighbor replacement is now explained.

The nearest neighbor replacement decision circuit 56 is supplied with four error flags FP2, FP1, FM1 and FM2 on both sides of the erroneous sample data P0 to be error concealed, three error flags FPP1, FPP0 and FPM1 from the line above the line of the sample data P0 and three error flags FNP1, FNP0 and FNM1 from the line below the line of the sample data P0 to determine the states of these error flags. That is, the nearest neighbor to the sample data having a "0" error flag (which indicates no error) is used in place the erroneous sample data P0. The control signal used replace the erroneous sample data P0 with nearest neighbor sample data is supplied to the error concealment method selector 58. When plural sample data are usable, the preference ranking for the sample data is set in the order of P1, M1, P2, M2, PP0, NP0, PP1, PM1, NP1 and NM1.

When nearest neighbor replacement is selected by the error concealment method selector 58, the selectors 65, 66 provide a nearest neighbor from the sample data PP1, PP0, PM1, P1, M1, NP1, NP0 and NM1 input via terminals 80 to 87 to the terminal 68 as determined by the nearest neighbor replacement decision circuit 56.

HIGH ACCURACY AND LOW ACCURACY TEMPORAL REPLACEMENT

The high accuracy temporal replacement decision circuit 52 is supplied with the six sample data P3, P2, P1, M1, M2 and M3 on both sides of the reference erroneous sample data P0, seven sample data LP3, LP2, LP1, LP0, LM1, LM2 and LM3 on the corresponding line of the previous frame, and the associated error flags FP3, FP2, FP1, FM1, FM2, FM3, FLP3, FLP2, FLP1, FLP0, FLM1, FLM2 and FLM3 in order to examine the error flags to determine whether temporal replacement, that is, replacement on the time axis, is feasible. When the above error flags are all "0" (thus indicating no error) and the difference between corresponding sample data is not more than a predetermined threshold HT, a control signal for substituting the sample data LP0 of the previous frame for the erroneous sample data P0 is transmitted to the error concealment method selector 58.

In other words, when all of the conditions $$FP3 = FP2 = FP1 = FM1 = FM2 = FM3 = FLP3 =$$
$$FLP2 = FLP1 = FLP0 = FLM1 = FLM2 = FLM3 = 0,$$
$$|LP3 - P3| \leq HT, |LM1 - M1| \leq HT,$$
$$|LP2 - P2| \leq HT, |LM2 - M2| \leq HT,$$
$$|LP1 - P1| \leq HT, |LM3 - M3| \leq HT$$

are satisfied, the erroneous sample data P0 is replaced by sample data LP0. That is, when the absolute value of the difference between each of the six sample data on both sides of the erroneous sample data P0 and the corresponding data on the same line of the previous frame, is no more than a predetermined threshold, temporal replacement is performed on the assumption that the erroneous sample data P0 has not changed since the previous frame. Meanwhile, a small value is used for the threshold HT, and this value can be varied.

When high accuracy temporal replacement is selected by the error concealment method selector 58, it causes the selector 66 to provide the sample data LP0 of the previous frame, input via terminal 88, to terminal 68.

Low accuracy temporal replacement is now explained.

The low accuracy temporal replacement decision circuit 55 is supplied with six sample data P3, P2, P1, M1, M2 and M3 on both sides of the erroneous sample data P0, seven sample data LP3, LP2, LP1, LP0, LM1, LM2 and LM3 on the corresponding line of the preceding frame, and associated error flags of these sample data FP3, FP2, FP1, FM1, FM2, FM3, FLP3, FLP2, FLP1, FLP0, FLM1, FLM2 and FLM3. In operation, the low accuracy temporal replacement decision circuit 55 produces a control signal to the selector 58 which enables a substitution of the corresponding sample data of the previous frame LP0 for the erroneous sample data P0 if the following conditions are satisfied: (a) the error flag FLP must be "0" (indicating no error), (b) for the three corresponding sample positions on each side of P0 and LP0, at least one pair of error flags representing the same position in the two succeeding frames has a "0" error flag, and (c) for each such error-free position, the absolute value of the difference between the corresponding sample data of the two succeeding frames is less than a corresponding value LT. That is, when the condition $$FLP0 = 0, \text{ and } (FP3 = FLP3 = 0 \text{ or }$$
$$FP2 = FLP2 = 0 \text{ or } FP1 = FLP1 = 0), \text{ and }$$
$$(FM1 = FLM1 = 0 \text{ or }$$
$$FM2 = FLM2 = 0 \text{ or } FM3 = FLM3 = 0), \text{ and }$$

$$(|LPn - Pn| \leq LT, |LMm - Mm| \leq LT$$

for all error-free n and m) where n, m indicate the numbers 1, 2 and 3 of the error-free sample data pairs, is satisfied, the sample data LP0 is substituted for the erroneous sample data P0. In other words, in the above mentioned high accuracy temporal replacement circuit 52, the six sample data on both sides of the erroneous sample data P0 and the corresponding sample data of the previous frame must all be error-free. High accuracy temporal replacement is effective for a low error rate, while low accuracy temporal replacement is effective for a high error rate. The threshold LT is a small value and can be varied.

When low accuracy temporal replacement is selected, the method selector 58 causes the selector 66 to output the sample data LP0 of the previous frame, input via terminal 88, to the terminal 68.

Figure 10:
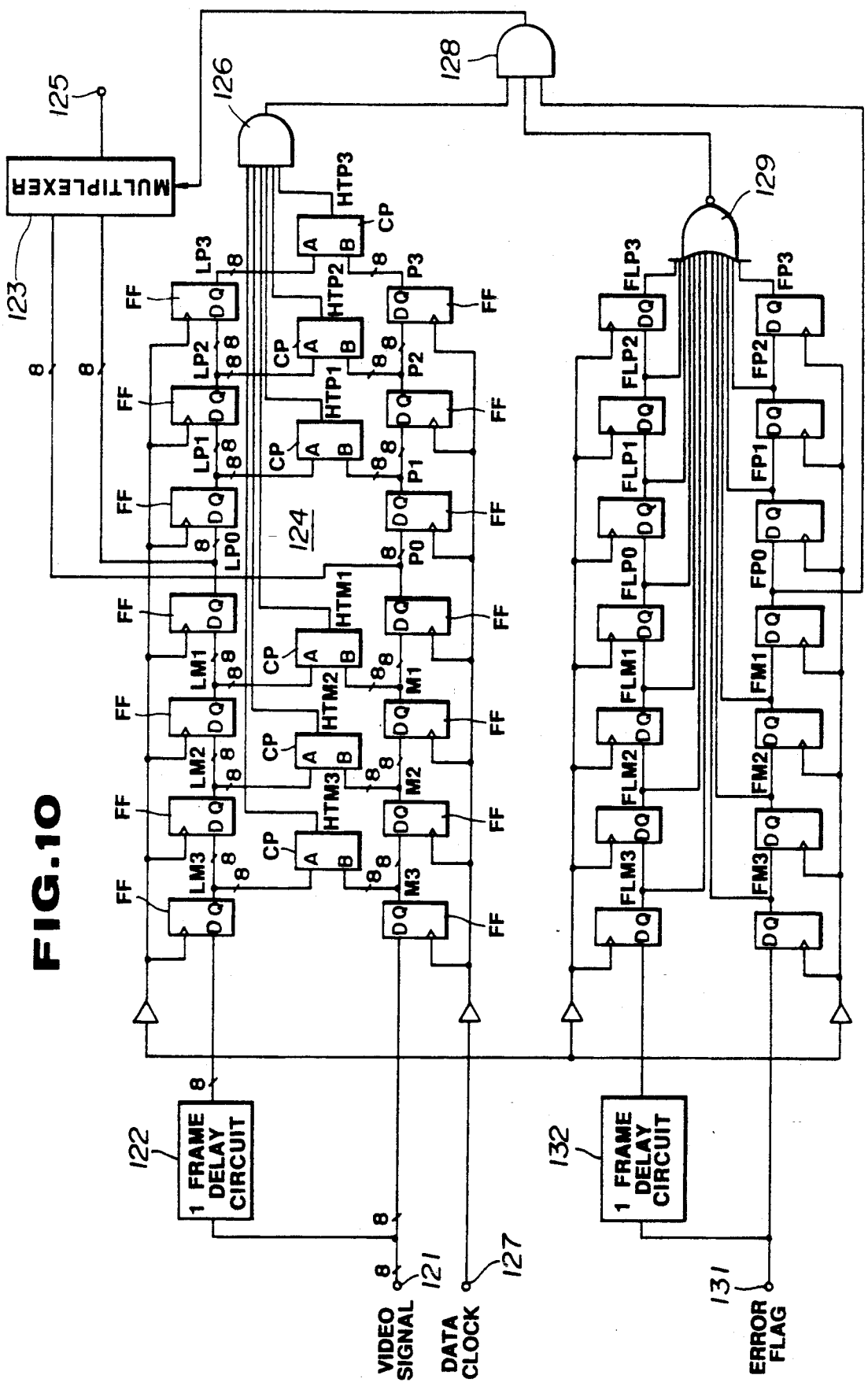
FIG. 10 is a block circuit diagram for illustrating one embodiment of a high accuracy temporal replacement decision circuit.

FIG. 10 shows a practical hardware construction for implementing high-accuracy temporal replacement.

In this figure, an input video signal to be processed for temporal replacement is supplied to the input terminal 121. This input video signal is delayed by one frame in a one-frame delay circuit 122, and transmitted to a comparison circuit 124 along with the one-frame delayed video signal. A multiplexer 123 substitutes the sample data of the previous frame for the erroneous sample data only when the near-by sample of the reference sample show a high frame correlation, and outputs the sample data of the previous frame at an output terminal 125.

The comparison circuit 124 includes a shift register circuit having a 7-state flip-flop (FF) register supplied with the input video signal, another shift register circuit having a 7-stage FF register supplied with the frame delay video signal, six comparator circuits CP for comparing corresponding near-by sample data of the current and previous frames, and an AND gate 126 for taking an AND of the outputs from the circuits CP to determine if frame correlation is high. The FF registers are operated in response to data clocks from a clock input terminal 127.

The outputs from the two 7-stage shift registers in the comparison circuit 124 correspond to sample data P3, P2, P1, P0, M1, M2, M3; LP3, LP2, LP1, LP0, LM1, LM2, LM3. The comparator circuits CP compare each of the three corresponding sample pairs on the left and right sides of the reference sample point, that is, sample data P3 to LP3, P2 to LP2 and so forth, which are separated in time by one frame. When the comparison error, that is, |P3−LP3|, |P2−LP2| etc. is within the above-mentioned threshold HT, the output of the comparator circuit CP is set to the high level or "1". A "co-valued" relation exists when comparison outputs HTP3, HTP2, HTP1, HTM1, HTM2, HTM3 from the six comparator circuits CP are at the high level. When the three near-by samples on both side of the reference sample data P0 are "co-valued" with the corresponding data of the previous frame, that is, when the comparison outputs HTP3 to HTM3 are all at the high level, the output of the AND gate 126 goes high, meaning that a determination has been made that the near-by frame correlation is high. The output from AND gate 126 is supplied to an AND gate 128, the output of which controls switching of the multiplexer 123. The function of the multiplexer 123 is to select one of the reference sample data P0 and the sample data LP0 of the previous frame to transmit to the output terminal 125.

In order for such high accuracy temporal replacement to be performed correctly, it is essential that the reference sample data P0 be in error, and that the near-by sample data of the current frame, i.e. P3, P2, P1, M1, M2, M3, and the corresponding sample data of the previous frame LP3, LP2, LP1, LP0, LM1, LM2 and LM3 be free of errors. These conditions are determined with the use of the respective error flags. Referring to FIG. 10, the error flags are supplied to an input terminal 131 By using two 7-stage shift registers and a frame delay circuit 132, the error flags FP3 to FM3 and FLP3 to FLM3 shown in FIG. 6 are provided at the outputs of the shift registers. The error flags of all of the neighboring points in both the current frame and the previous frame are input to NOR gate 129. If all of these error flags are "0" i.e. none of the points are erroneous the output of NOR gate 129 is "1". This output is input to AND gate 128, together with the error flag of the sample data point FP0. Thus the output from the AND gate 128 goes high only when the output from the AND gate 126, the output from the NOR gate 129 and the error flag FP0 are at the high level. At this time, the multiplexer 123 is operative to select the sample data LP0, providing it to the output terminal 125.

In using the temporal replacement circuit shown in FIG. 10 when the sample data in the vicinity of the sample data to be replaced are error-free and exhibit high interframe correlation, that is, when the image is essentially stationary with only small movement for variation, temporal concealment is performed with the use of the error-free sample data of the preceding frame so that optimum temporal error concealment with extremely small concealment error may be realized in response to the contents of the video image.

Figure 11:
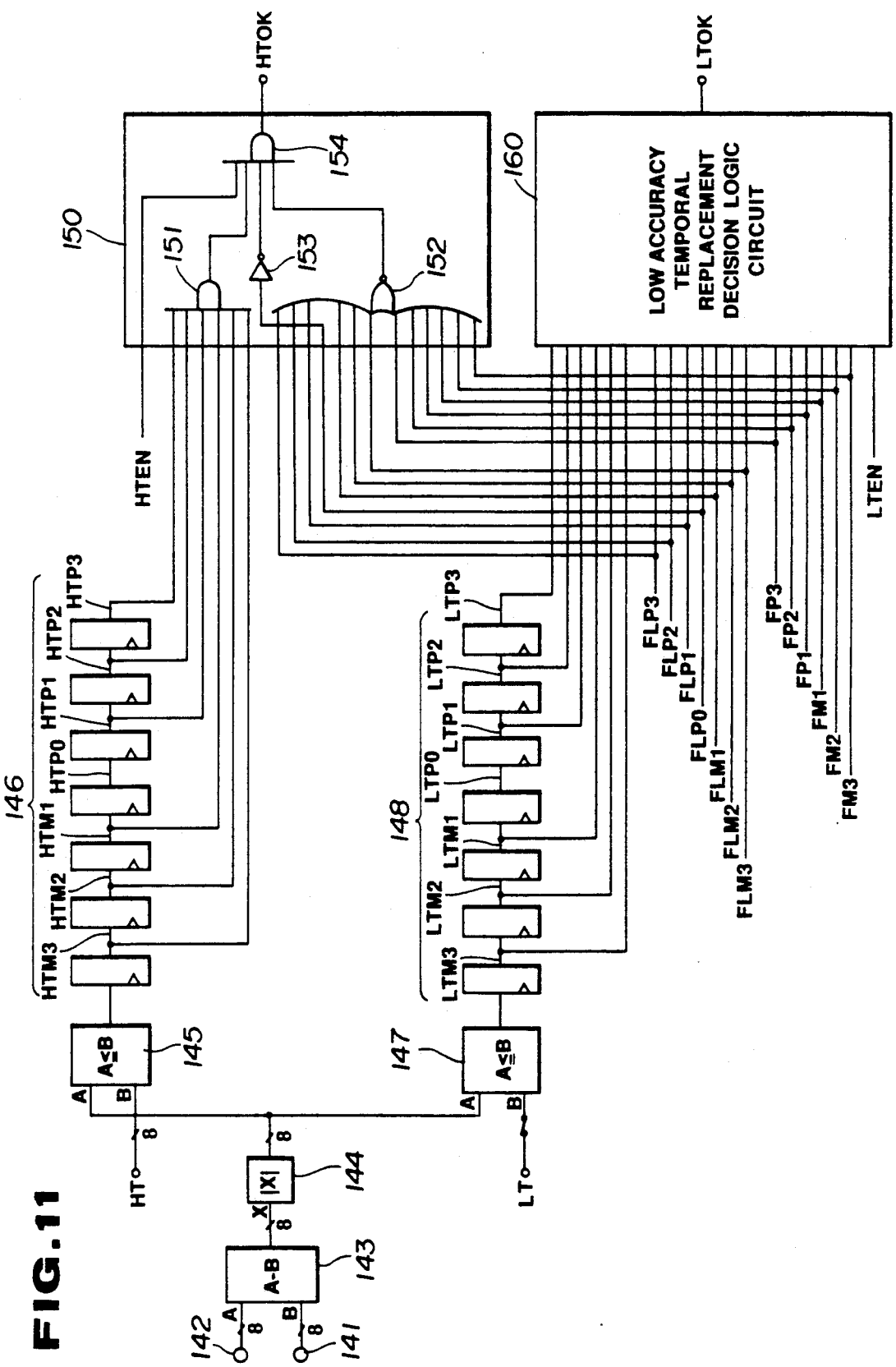
FIG. 11 is a block circuit diagram for illustrating embodiments of high and low accuracy temporal replacement circuits.

The circuitry of FIG. 10 is somewhat complex because the register flip flops in the comparator circuit 124 are adapted to provide a one-sample delay to the video data, while six comparator circuits CP are required. In the circuit of FIG. 11, video sample data are first compared, and the results of comparison are utilized after having been delayed by one sample, for realizing an equivalent result. FIG. 11 also shows an embodiment for performing low accuracy temporal replacement.

Referring to FIG. 11, video sample data of the current frame are supplied to an input terminal 141, while video sample data of the previous frame, that is, video sample data delayed by one frame, are supplied to an input terminal 142. The current frame data is subtracted at a subtractor 143 from the previous frame data and an absolute value is produced by an absolute value circuit 144 to yield the above mentioned comparison errors |LP3−P3|, |LP2−P2| etc. These comparison error outputs are transmitted to a comparator 145 for comparison with a threshold HT for high accuracy temporal replacement and a comparison output which goes high when the comparison error output is not more than the threshold HT is transmitted to a 7-stage shift register 146. With the exception of the central register of the shift register 146, the outputs of the six remaining registers correspond to HTP3, HTP2, HTP1, HTM1, HTM2 and HTM3. These outputs HTP3 to HTM3 are provided to an AND gate 151 of a high accuracy temporal replacement decision logic circuit 150. To the high accuracy temporal replacement decision logic circuit 150. error flags FP3, FP2, FP1, FM1, FM2 and FM3, associated with six nearly samples of the reference sample point of the current frame, and error flags FLP3, FLP2, FLP1, FLM1, FLM2 and FLM3 of the corresponding sample points of the preceding frame, are supplied, and transmitted to a NOR gate 152. The error flag FLP0 of a sample point of the preceding frame corresponding to the reference sample point is transmitted via inverter 153 to an AND gate 154, to which the output of the AND gate 151 and the output of the NOR gate 152 are also supplied. A high accuracy temporal replacement enable signal HTEN, indicating that the high precision temporal replacement is enabled, is transmitted to the AND gate 154. Thus the AND gate 154 outputs a high accuracy temporal replacement decision signal HTOK, which goes high when the conditions for high accuracy temporal replacement are satisfied and high accuracy temporal replacement is feasible. The signal is output to error concealment method selector 58 in FIG. 9. Responsive to this decision signal HTOK, sample data LP0 of the preceding frame is substituted for the reference sample data P0 by way of high accuracy temporal replacement.

For performing low accuracy replacement in FIG. 11, the absolute value of the comparison error output from the absolute value circuit 144 is supplied to a comparator circuit 147 where it is compared to a threshold for low accuracy temporal replacement LT. A comparison output which goes high when the absolute value output is not more than the threshold LT is transmitted to a 7-stage shift register 148.

The outputs LTP3, LTP2, LTP1, LTP0, LTM1, LTM2 and LTM3 from these shift registers 148 represent logical values indicating the result of comparison, such that, with the output of the central register as the reference, the output LTP3 represents the result of comparison $|LTP3-P3| < LT$. The six outputs LTP3 to LTP1 and LTM1 to LTM3, with the exclusion of the result of comparison for the reference position, are transmitted to a low accuracy temporal replacement decision logical circuit 160.

Figure 12:
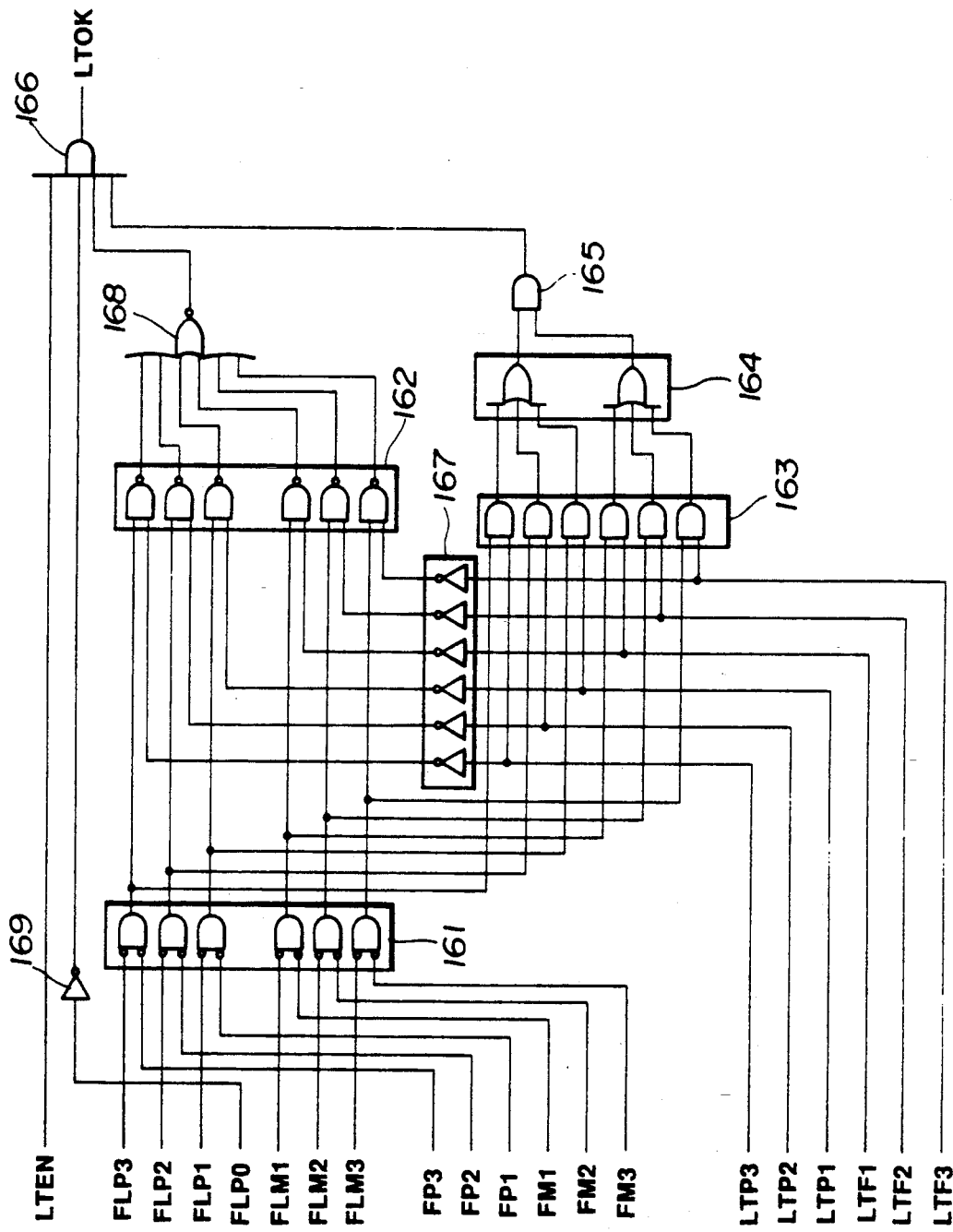
FIG. 12 is a block circuit diagram for illustrating an embodiment of a low accuracy temporal replacement decision logic circuit.
Figure 13:
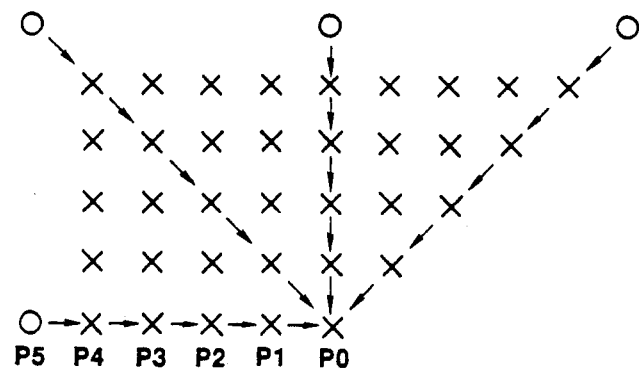
FIGS. 13 and 14 illustrate a number of generations of sample data produced by repetitive replacement.

The low accuracy temporal replacement decision logic circuit 160 is organized as shown for example in FIG. 12. Logic circuit 160 determines whether the above mentioned conditions for low accuracy temporal replacement are satisfied. Thus the error flags FP3, FP2, FP1, FM1, FM2 and FM3 of the six nearby sample points and the error flags FLP3, FLP2, FLP1, FLM1, FLM2 and FLM3 of the corresponding sample points of the preceding frame are supplied respectively to six NOR gates of the NOR gate set 161, such that the output of the NOR gate for which both input samples are free of errors goes high. The six outputs from the NOR gate set 161 are transmitted to six NAND gates of the NAND gate set 162 and six AND gates of an AND gate set 163. The above comparison results LTP3 to LTP1 and LTM1 to LTM3 are transmitted to six AND gates constituting the AND gate set 163. Thus the outputs of the AND gates of the AND gate set 163 are at "H" when the input sample pair is error free and not higher than the above threshold LT. The three outputs on each side of the AND gate set 163 are sent to two OR gates of an OR gate set 164. The output of each of the OR gates goes high when one of its inputs is at an "H" level. The outputs of the OR gates of the OR gate set are sent to an AND gate 165, the output of which goes high when at least one sample pair on each side of the reference sample is error-free and not higher than the threshold LT. The output of the AND gate 165 is transmitted to an AND gate 166. The six NAND gates of the NAND gate set 162 are supplied with the above mentioned six comparison result outputs LTP3 to LTP1 and LTM1 to LTM3 which are supplied after inversion by six inverters of an inverter set 167. Thus the output of each of the NAND gates of the NAND gate set 162 goes high when the input sample pair is free of errors and the result of comparison is not unfavorable. The outputs of the NAND gates of the NAND gate set 162 are sent to an AND gate 168, the output of which is sent to AND gate 166. The output of AND gate 168 is "1" if the difference between all corresponding error-free points is not higher than the threshold LT. The error flag FLP0 of the sample data LP0 to be substituted, after inversion at an inverter 169, and a low accuracy temporal enable signal LTEN, indicating that of the low accuracy temporal replacement is enabled, are also supplied to the AND gate 166. Thus the AND gate 166 outputs a low accuracy temporal replacement decision signal LTOK which goes high when the conditions for low accuracy temporal replacement are satisfied and low accuracy temporal replacement is feasible. This signal is output to concealment method selector 58 in FIG. 9. Responsive to this decision signal LTOK, the sample data LP0 of the preceding frame is substituted for the reference sample data P0 to perform the low accuracy temporal replacement.

RECURSIVE REPLACEMENT

Recursive replacement is now explained with reference to FIGS. 9 and 13 to 17.

Figure 14:
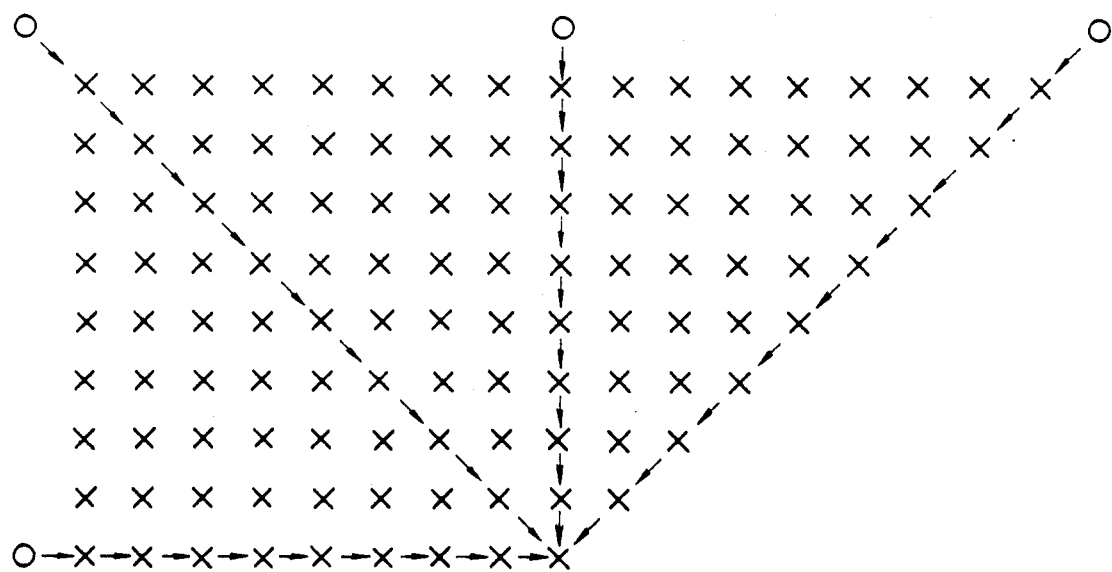

A recursive replacement decision circuit 57 shown in FIG. 9 is supplied with error flags, including an error flag FP0 of the point to be concealed, and a recursive count from a recursive count memory 60. Recursive replacement means the repetitive replacement of previously concealed sample data for the erroneous sample data P0. This is performed in cases wherein the error rate of supplied sample data is so high that the usual interpolation or replacement methods described above cannot be performed. For example, sample data obtained after replacement with the use of error-concealed sample data is regarded as first generation sample data, and sample data obtained by a second replacement using such first generation sample data is regarded as second generation sample data. The state of generation is represented by the recursion counts. In the example shown in FIG. 13, sample data P5 is error free, as indicated by a mark 0, and sample data P4, P3, P2, P1 and P0 are all in error, as indicated by a mark X. In this example, the sample data P4 is replaced by sample data P5 and the sample data P3 is replaced by sample data P4 (a recursive replacement of P5) so that P3 constitutes first generation sample data. The sample data P2 is replaced by sample data P3 so that P2 is the second generation data produced by recursive replacement. The sample data P1 is replaced by sample data P2 so that P1 is third generation data. The sample data P0 is replaced by the sample data P1 so that P0 is the fourth generation data produced by recursive replacement. FIG. 14 shows a specific example in which the above mentioned recursive replacement operation is performed up to the eighth generation.

An initial recursive count value is set for each of the sample data depending on the error concealment method, that is, the concealment strategy or algorithm, that was used to produce the sample data at such position and this initial value is increased by 2 each time the above mentioned recursive replacement is performed.

TABLE 2

| Concealment Type | Recursion Count |
| --- | --- |
| Error-Free Posit | 0 |
| Ideal Direction Interpolation | 0 |
| High-Accuracy Temporal Replacement | 0 |
| Ideal Direction Replacement | 1 |
| Any Direction Interpolation | 1 |
| Low-Accuracy Temporal Replacement | 1 |
| Recursive Replacement | +2 |
| | (7 or 15 maximum) |
| Default Temporal Replacement | 7 or 15 |
| Horizontal/Vertical Blanking Point | 7 or 15 |

Default temporal replacement refers to a substitution of sample data LPO from the previous frame for the erroneous sample data PO in cases for which none of the above mentioned error concealment methods can be utilized. This replacement method is performed for such erroneous samples when the error rate is so high that recursive replacement cannot be utilized. If default temporal replacement is performed repeatedly, the image is seen to be stationary.

Figure 15:
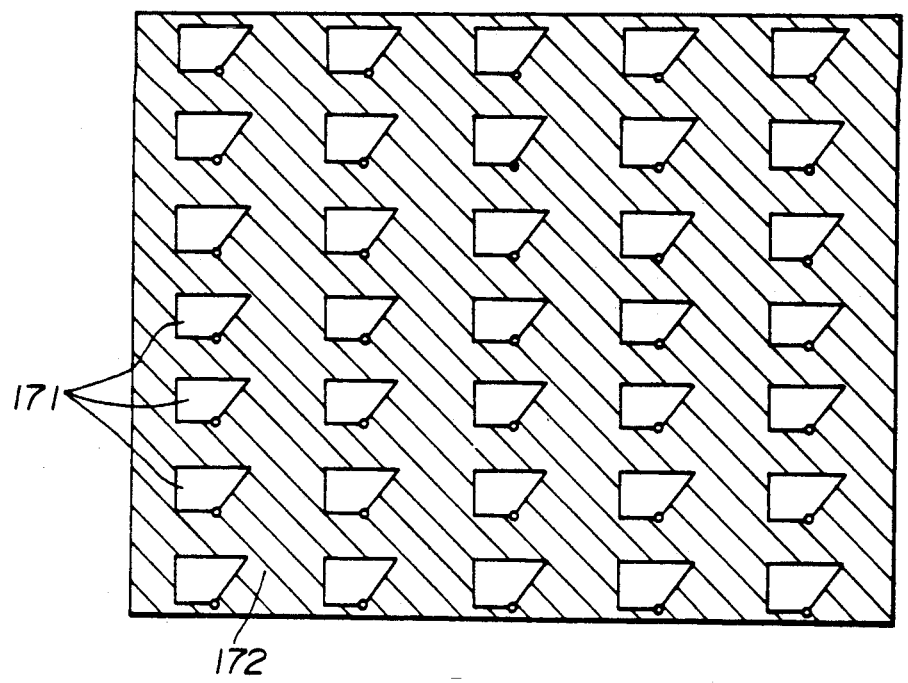
FIGS. 15 and 16 represent video images produced by a combination of recursive replacement and default temporal replacement.
Figure 16:
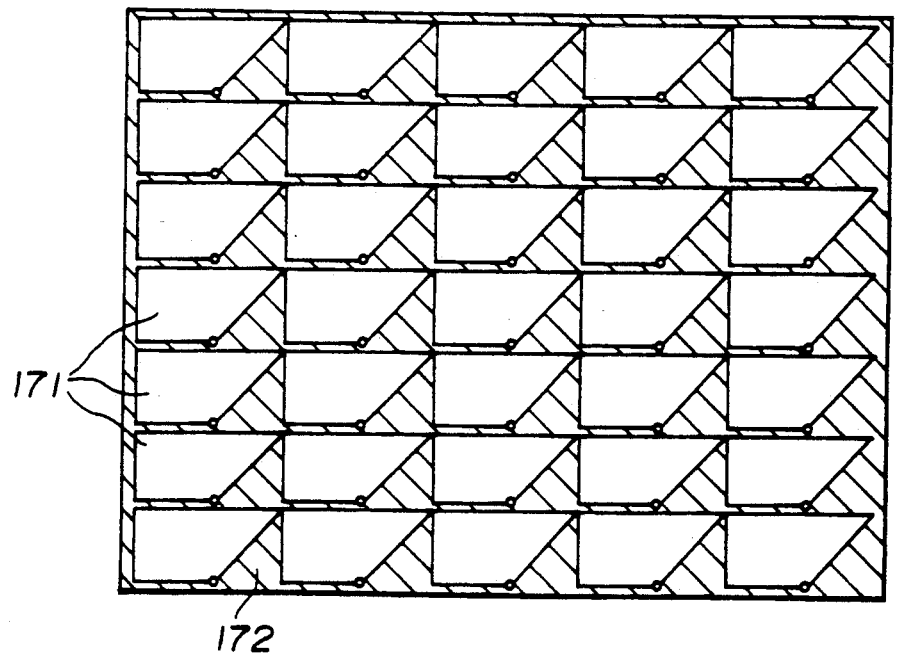

In the present embodiment, the upper value of the recursive count is varied to change the upper limit for recursive replacements. If the erroneous samples that cannot be concealed by recursive replacement are to be concealed by default temporal replacement, changing the upper generation limit in the above described manner is tantamount to changing the ratio between concealment by default temporal concealment and concealment by recursive replacement of erroneous sample points in an image that cannot be concealed by the usual concealment methods. More specifically, the upper limit for recursive replacement may be changed responsive to the image type or contents. For example, in the case of an image having high temporal correlation, that is, high frame-to-frame or field-to-field correlation, such as a still image, the upper limit of recursive replacement is reduced to reduce the concealment area of the image that can be produced by recursive replacement 171 while widening that which can be produced by default temporal replacement 172, that is, the area for which the temporally preceding image is displayed (FIG. 15). Conversely, for an image showing a lower temporal correlation, such as in the case of animation image or during shuttle playback mode, the above upper value is increased to increase the recursive replacement concealment area 171 while narrowing the default temporal replacement concealment area 172 (FIG. 16). In FIGS. 15 and 16, since the same sample data are used in the area 171 concealed by recursive replacement, the area 171 is displayed as a single color and intensity, as if it were composed of a single pixel. On the other hand, in the area 172 concealed by default temporal replacement, temporally preceding error-free sample data which are closest to the sample positions being replaced are used. When the errors are consecutive, old sample data are used directly, so that the image is seen to remain stationery. Hence, in the case of an image having relatively little movement the area 172 in which the preceding image data may be directly used is widened, as shown in FIG. 15, to improve image resolution, while in the case of an image depicting vigorous movement the use of real time data is increased at the cost of resolution, as shown in FIG. 16, to eliminate the adverse effects otherwise caused by the use of the residual preceding image.

A determination of the image types or contents, and above all, the magnitude of movements, may be made for example, on the basis of the VTR playback mode. This is based on the consideration that an image having less movement is likely to be produced during the still or slow playback mode of the VTR while an image depicting vigorous movement is likely to be produced at high tape speeds, such as during the so-called shuttle mode. That is, during shuttle, cue or review playback mode, the upper limit of the number of times that recursive replacement may be repeated is increased to widen the area of recursive replacement, while, during the still or slow playback mode, the upper limit is reduced to narrow the image area produced by recursive replacement. As specific exemplary values of the upper limits, the state in which the maximum number of the recursive count is set to 7 and recursive replacement is limited to 4 generations and the state in which the maximum number of the recursive count is set to 15 and recursive replacement is limited to 8 generations, may be set alternately.

The recursive replacement repetition limit may also be changed as a function of the error rate. Also, in the shuttle playback mode, for example, the area of recursive replacement, that is the upper limit of the number of recursive replacements, may be increased for high speed operation with a high error rate. The recursive counts are stored in a recursion count memory 60 shown in FIG. 9 and are set in association with all of the sample data.

In the recursive replacement decision circuit 57, the recursive counts for each of the positions of sample data P1 preceding the sample data to be concealed and sample data PP1, PP0 and PM1 on the line above the line or the sample data to be concealed, are compared to the maximum value of the recursive count input via terminal 67, for example, 7, and the position of the sample data having the smallest recursive count less than the maximum value (in this example, 7) is selected. A control signal employed for recursive replacement is supplied to the error concealment method selector 58. The recursive count of the selected position is sent from the recursive replacement decision circuit 57 to a recursive count generator 59. A signal indicating the error concealment method that has been selected by the selector 58 is also supplied to the recursive count generator 59. When the recursive replacement method is selected to generate sample data at a given position, the recursive count of the selected position is increased by 2 and the thus incremented recursive count is newly stored in the recursive count memory 60 as the recursive count of this substituted position. When other concealment methods are instead selected, the recursion count for this position is set as shown in Table 2. When the recursive counts of the positions of the sample data P1, PP1, PP0 and PM1 are of the sample value, the ranking of preference is set in the order of sample data P1, PP0, PP1 and PM1.

Figure 17:
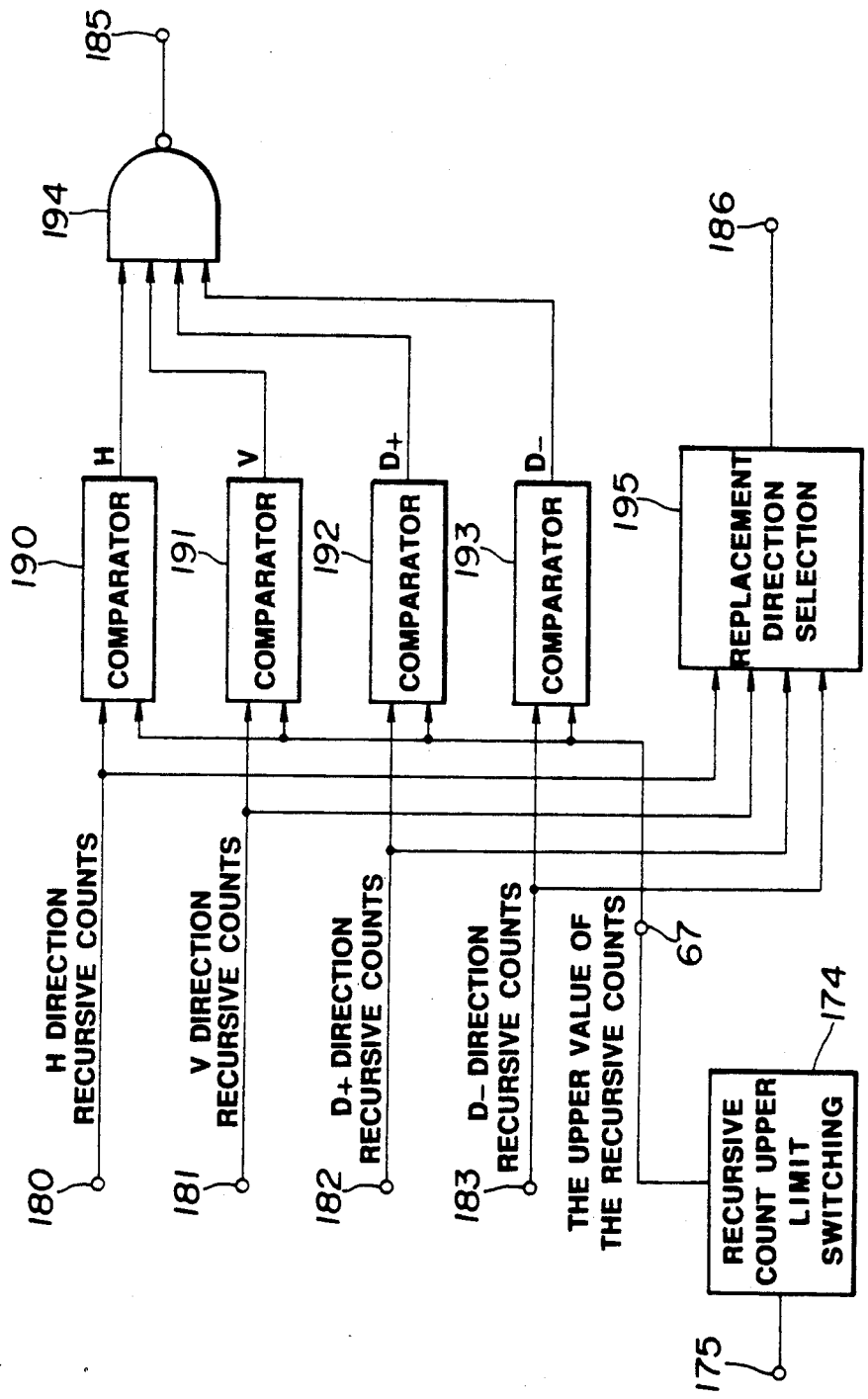
FIG. 17 is a block circuit diagram of a repetitive replacement decision circuit.

FIG. 17 shows a specific circuit configuration for the recursive replacement decision circuit 57. In this figure, H direction recursive counts, V direction recursive counts, D-direction recursive counts and D+ direction recursive counts of sample data P1, PP0, PP1, PM1 in the vicinity of sample data P0 to be concealed for errors, are supplied to comparators 190 to 193 via terminals 180 to 183, respectively. These recursive counts are compared in the comparators 190 to 193 with the upper value of the recursive count, such as 7 in this example, supplied via terminal 67. When at least one of the recursive counts is less than 7, a signal indicating recursive replacement feasibility is output by NAND gate 194 at a terminal 185. The upper limit of the recursive count is supplied from a recursive count upper limit switching circuit 174, which may be switchingly controlled by a switching control signal supplied via terminal 175. The switching control signal from terminal 175 may be, for example, a signal indicating whether the VTR is in the shuttle playback mode. The switching circuit 174 may output 15, for example, in the case of the shuttle mode and 7 otherwise, to the terminal 67, as the upper limit of the recursive count. The recursive counts in the various directions are supplied to a replacement direction selection circuit 195 where the position of the smallest recursive count is selected and a signal indicating such position is output at a terminal 186. The signals indicating recursive replacement feasibility and the selected positions are supplied as the recursive replacement control signal to the error concealment method selector 58 shown in FIG. 9.

When the recursive replacement method is selected by the error concealment method selector 58, the selectors 65, 66 are controlled so that the sample data selected by the recursive replacement control decision circuit 57 from sample data PP1, PP0, MP1 and P1 input via terminals 80 and 83 are output via selectors 65 and 66 at the terminal 68.

CONCEALMENT METHOD SELECTION

As described above, the error concealment method selector 58 selects one of a variety of interpolating or substituting processes which is feasible and has a higher ranking of preference. If none of the above mentioned error correcting methods can be applied, the selector 66 is controlled to perform the default replacement so that the sample data LP0 of the previous frame supplied via terminal 88 is selected. Thus the sample data concealed by the concealment method selected by the error concealment method selector 58 or the original sample data P0 are output via selector 66 at the terminal 68.

The sample points may be displayed by different colors depending upon the ideal directions at the respective sample points ranked at the time of the ideal direction ranking. Thus, color signals indicating the ideal directions, such as red for the sample point with the H selected direction, blue for the sample points with the V selected direction, green for the sample points with the D− direction or yellow for the sample points with the D+ selected direction, may be output and displayed for monitoring on a CRT, as a function of the ranking flags from the ranking decision circuit 45 already explained with reference to FIG. 7. Different color display may also be used as a function of the selection of the concealment methods shown in Table 1.

GRAY FLAG

Concealed video sample data are supplied from a terminal 68 of FIG. 9 to a gray flag processing circuit 118 of FIG. 18, to which the gray flag explained in connection with FIG. 1 is also supplied via terminal 91 and the reference sample data P0 from the terminal 89 is supplied via terminal 69. The gray flag processing circuit 118 selects and outputs one of the original sample data or the error-concealed sample data on the basis of error-concealed sample data from various interpolation and replacement operations. Circuit 118 includes a selector 92, a comparator 93 and an AND gate 94.

With seemingly correct sample data for which the gray flag is set, the following operation is performed. The error-concealed sample data and the original sample data before error concealment are compared to each other. When the difference is less than a predetermined threshold value Vth, the original sample data is output as the correct data and, when the difference is larger than the above threshold Vth, the error concealed sample data is output.

Figure 18:
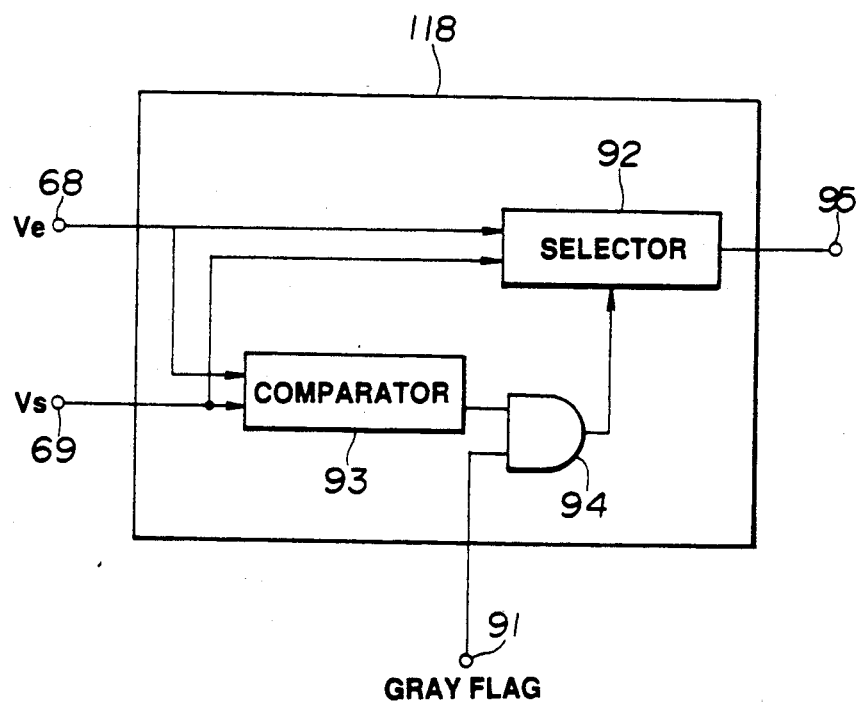
FIG. 18 is a block circuit diagram of a gray flag processing circuit.

More specifically, referring to FIG. 18, the above gray flag is supplied via terminal 91 to an AND gate 94, to the other input of which an output of the comparator 93 is supplied. The value Vs of the original sample P0 input from terminal 89 via terminal 69 is compared to the value Ve of the error-concealed output sample data from the terminal 68 at the comparator 93. When the result of the comparison is less than the above predetermined threshold Vth, that is, when it is determined that the condition $|Vs-Ve|<Vth$ is satisfied, a signal "1" is transmitted from the comparator 93 to the AND gate 94. Therefore, when the gray flag supplied to the AND gate 94 via terminal 91 is in the set state, or "1", the output of the AND gate 94 is "1", so that the original sample data P0 is selected at the selector 92. When it is determined at the comparator 93 that the above condition is not satisfied, the error-concealed sample data is selected at the selector 92 and output at a terminal 95. When the gray flag is in the reset state, or "0", the AND gate 94 is turned off to interrupt the output from comparator 93 so that the selector 92 selects the error-concealed output from the terminal 68 to issue the error-concealed output at the terminal 95.

In this manner, the sample data whose gray flags are set, that is, seemingly correct sample data, are treated for the time being as error-free sample data, and compared with error-concealed data obtained by interpolation using near-by sample data. When the result of comparison is markedly different from the error-concealed data, the error-concealed sample data are used. However, when the result of comparison is within the above mentioned threshold Vth, the seemingly correct sample data are deemed to be correct sample data. This avoids the situation in which all the sample data of the inner code block are deemed to be in error in outer erasure correction and prevents an unnecessary error concealment operation from being performed for all of these sample data while avoiding a situation in which erroneous sample data mistakenly deemed to be free of error are output directly. By eliminating the unnecessary error concealment in this manner, the error rate may be improved by $3.4 \times 10^{-2} (=2/(60-2))$.

In sum, when the number of erroneous sample data which have not been corrected at the time of error correction at the first code series of the product code exceeds the error correction capability of the second code series, gray flags are set for the erroneous sample data in the series deemed to be error-free at the time of the second code series. For sample data whose gray flag is set, the original sample data are compared to the error-concealed data, and the original sample data are used as the correct sample data when the difference is less than a predetermined value, thereby improving the error rate and preventing the erroneous data from being output as the correct data through error detection mistakes.

WEIGHTED OPERATION

The concealed video sample data output at terminal 95 is transmitted to the weighted mean calculating circuit 120 of FIG. 1.

The arithmetic mean calculating circuit 120 compensates for distortions in the sequence of even and odd numbered fields which occur when video signals are reproduced, for example, by a VTR operating at a speed other than a normal reproduction speed. The circuit 120 functions to generate line signals for a second field on the basis of plural line signals of a first field to suppress flicker or objectionable vertical image movement and includes a weighted mean calculating circuit for summing the line signals of the first field after multiplication by variable coefficients. The circuit 120 senses that the line signals processed by the weighted mean calculating circuit are outside the effective video signal area to change the coefficients used in the weighted mean calculating operation to improve image properties in the vicinity of the upper and lower edges of the picture and to suppress image flicker or vertical movement.

In other words, when the line signals are outside the effective video signal area, the gain characteristics of the line signals of the two fields can be analogous to each other even at the upper and lower picture edges. In addition, delay characteristics of the line signals can be improved to suppress image flicker and vertical movement for the whole picture.

An example of the weighted mean calculating circuit 120 is explained by referring to FIGS. 19 to 25.

Figure 19:
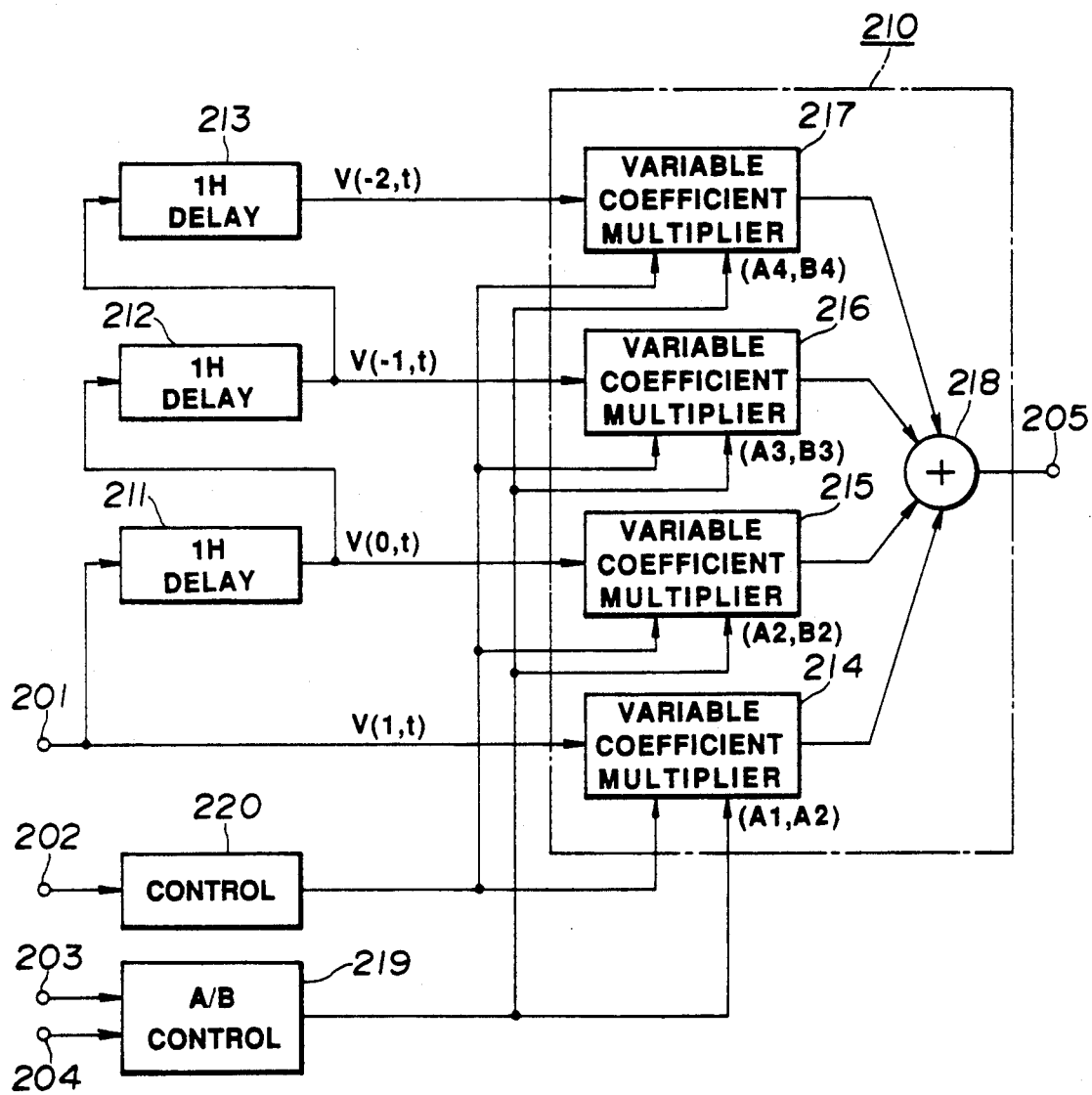
FIG. 19 is a block circuit diagram showing a weighted mean processing circuit and its peripheral circuitry.

In FIG. 19, the weighted mean calculating circuit 210 represents the main portion of the weighted mean calculating circuit 120. Four sample data, distributed on four lines in the vertical direction of the picture, are supplied to the weighted mean calculating circuit 120. These sample data are produced in general by delaying the video signals input via input terminal 201 by means of three series connected 1H delay circuits 211, 212, 213. However, in the embodiment described in connection with FIG. 1, line delay circuits used for two-dimensional error concealment are used in conjunction with the weighted mean operation to reduce the number of line delay circuits. The weighted mean signal thus obtained at the weighted mean calculating circuit 210 is output at an output terminal 205 as an arithmetic mean output video signal.

The weighted mean calculating circuit 201 is constituted by variable coefficient multiplication circuits 214, 215, 216, 217 and a summation circuit 218. Two sets of coefficients A(A1, A2, A3, A4) and B(B1, B2, B3, B4) are associated with the variable coefficient multiplication circuits 214 to 217, and are adapted to be switched selectively to select the correlation between input and output fields. More specifically, such selective switching is performed by inputting odd and even field data for each of the input and output fields to an A/B control circuit 219 via input terminals 203, 204. Thus the A/B control circuit 219, serves to determine the correlation between the input and output fields on the basis of the above two data lines by controlling the variable multiplication circuits 214 to 217 with the use of an A/B control signal. A field position signal indicating the currently input video line signal of the present field is input to the terminal 202 and thence to a control circuit 220, the output signal of which is transmitted to the variable coefficient multiplication circuits 214 to 217.

The field formed by the weighted mean calculating operation with the coefficient set A is termed $F_A$, whereas the field formed by the weighted mean calculating operation with the coefficient set B is termed $F_B$. The coefficient sets A,B need to be selected so that the gain $G_A$ of the line signal of the field FA and the gain $G_B$ of the field $F_B$ are sufficiently close so that flicker on the picture surface is not a problem. It is also necessary that the differences between the delay $D_A$ of the line signal of the field $F_A$ and the delay $D_B$ of the line signal of the field $F_B$ is as close to ½ line as possible.

Figure 20:
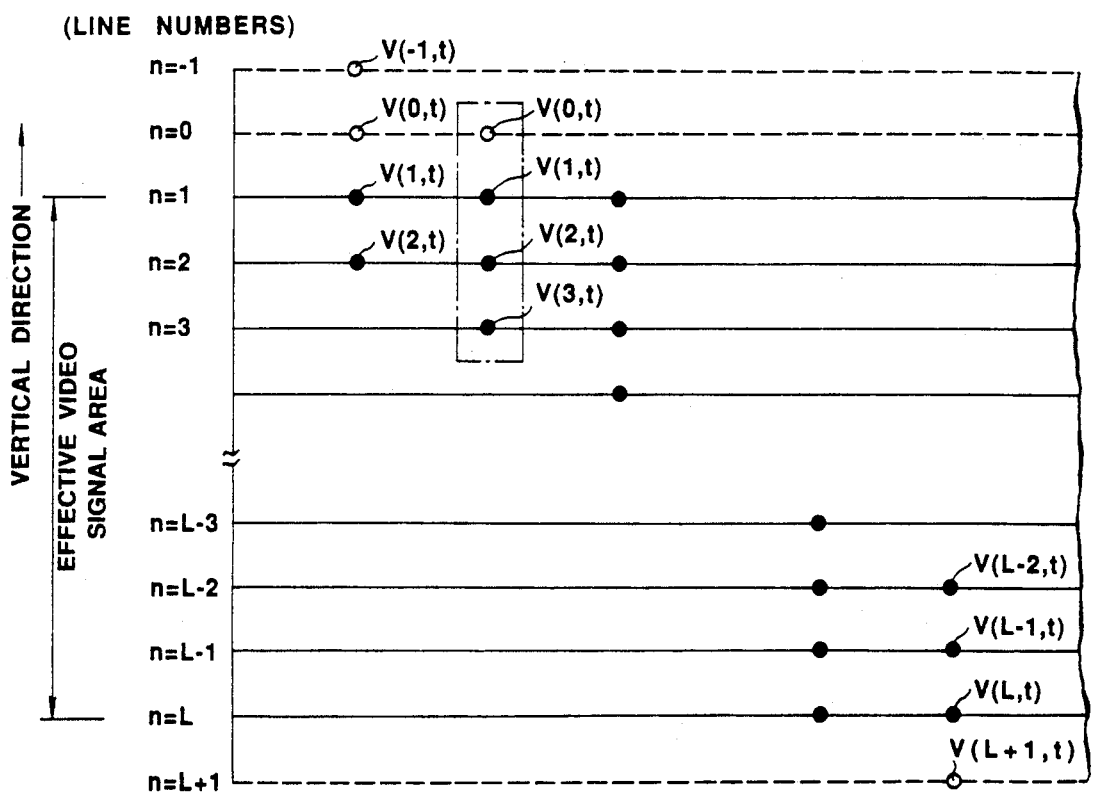
FIG. 20 illustrates weighted mean processing near the upper and lower edges of a picture.

With reference to FIG. 20, the operation of the weighted mean calculating circuit 210 is explained.

FIG. 20 shows the relative position of the line signals of the input video signals on the picture surface, wherein the vertical axis of FIG. 20 corresponds to the vertical direction on the picture surface and the line signals with the line numbers n=1 to L indicate that the line signals are within the effective video signal area. The following explanation is provided to illustrate the performance of a weighted mean operation using plural line signals, such as four line signals, of the original field of the input video signals. It is assumed that the coefficient sets A, B each consists of four sets of coefficients A1m, A2m, A3m, A4m; B1m. B2m, B3m, B4m, m being 1, 2, 3 or 4. With the value of the line signal at a predetermined position t (position from the left end of horizontal scanning) on the n'th line of the original field given as v(n, t), the value of the line signal at a predetermined position on the n'th line of the field $F_A$ given as x(n, t), and with the value of the line signal at the predetermined position on the n'th line of the field $F_B$ given as y(n, t), the values x(n, t), y(n, t) of the line signal are given by $$x(n,t) = A1m \cdot v(n + 1,t) + A2m \cdot v(n,t) +$$
$$A3m \cdot v(n - 1,t) + A4m \cdot v(n - 2,t)$$
$$y(n,t) = B1m \cdot v(n + 1,t) + B2m \cdot v(n,t) +$$
$$B3m \cdot v(n - 1,t) + B4m \cdot v(n - 2,t)$$

where, when n≦2, m=n, when 3≦n≦L−1, m=3 and when n=L, m=4.

Thus the coefficient sets A, B are changed in dependence upon the line position of the line signal of the original field subjected to the weighted mean calculating operation. This operation is controlled by the control circuit 220 based upon the field position signal input via input terminal 202 in FIG. 19.

If the variable coefficient multiplication units are comprised of the usual types of such units, circuit construction becomes complex and operational speed is lowered. If the circuit is constructed with the use of ROMs, that is, if all weighted line signal values or data are provided in advance and read out to produce the results comparable to those produced by multiplication, the processing speed is increased. However, since the coefficients are variable, output data for the variable coefficients need to be recorded with a resulting increase in memory capacity and circuit scale. For providing a simplified circuit capable of high speed operation, it is preferred to combine data bit shifting and summation to adjust the values of the coefficients appropriately.

Figure 21:
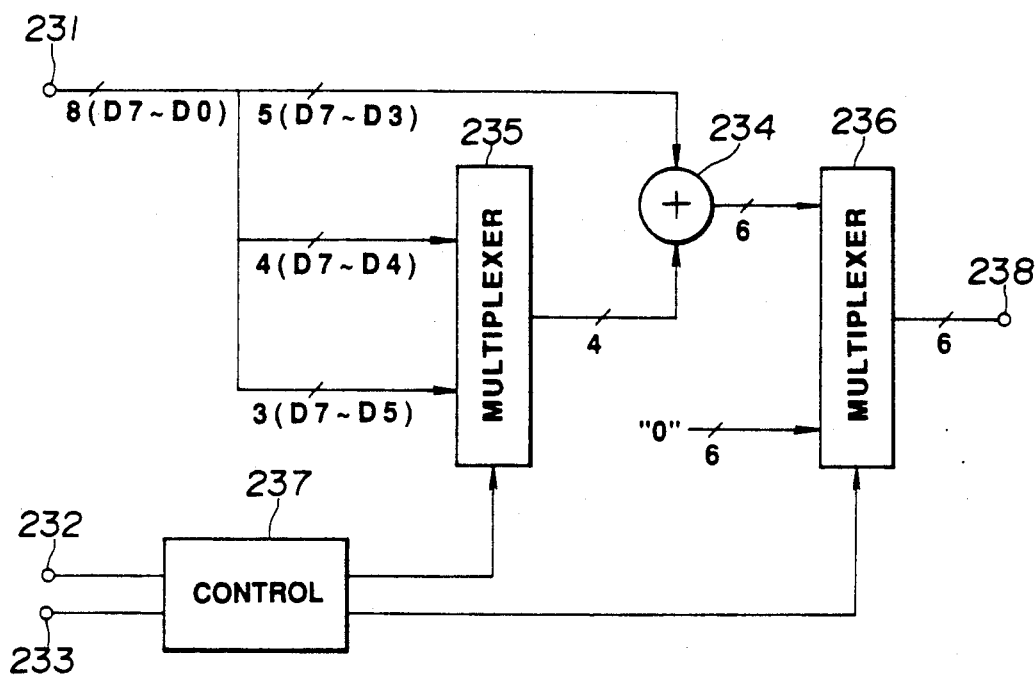
FIG. 21 is a block diagram for illustrating the principle of implementing a variable coefficient multiplication circuit utilizing bit shifting and summation.

A circuit organization for implementing the above variable coefficient multiplication function by a combination of bit shifting and summation is explained with reference to FIG. 21. The principle of the circuit is that the values of the input line signal are shifted towards the lower order bits, so that the line signal data is multiplied by ½ for each one bit shift, and the thus shifted bits are summed to produce weighted line signals. FIG. 21 illustrates the principle of operation of the variable coefficient multiplication circuits 214, 215, 216, 217 of FIG. 19. For example, in the variable coefficient multiplication circuit 214, the input line signal is provided to an input terminal 231 in FIG. 21 corresponding to the input terminal 201 shown in FIG. 19. The field position signal is input to an input terminal 232 corresponding to the input terminal 202 of FIG. 19. The input terminal 233 is connected to an output of the A/B control circuit in FIG. 19 and is fed with the A/B control signal. The output terminal 238 is connected to the summation circuit 218 of FIG. 19.

In the embodiment of FIG. 21, only two coefficients are used for each of the coefficient sets A, B, for purposes of illustration. For these coefficients, the values shown in Table 3 are used.

TABLE 3

| line signal position | coefficient A | coefficient B |
|---|---|---|
| X | $2^{-3} + 2^{-5} =$ 0.15625 | $2^{-3} + 2^{-4} =$ 0.1875 |
| Y | 0 | $2^{-3} + 2^{-5} =$ 0.15625 |

The numerals, such as 8, arranged underneath the signal lines in FIG. 21, indicate the number of data bits provided thereby. $D_7$ to $D_0$ stand for the value of each bit of the 8-bit data. The value $v(n, t)$ of the line signal input via input terminal 231 is the 8-bit data ($D_7$ to $D_0$), the upper 5 bits ($D_7$ to $D_3$) of which are sent to summation circuit 234 as a lower 5-bit data input. This is equivalent to shifting the 8-bit input data at the input terminal 231 by 3 bit positions to the right, effectively multiplying the input data by $2^{-3}$ and supplying the shifted (multiplied) data, as the lower 5 bits of an input to the summation circuit 234. The upper four bits ($D_7$ to $D_4$) and upper three bits ($D_7$ to $D_5$) of the 8 bits input at terminal 231 are also supplied to multiplexer 235 as lower 4 bit data and lower 3 bit data, respectively. This is equivalent in shifting the input data right by four bits (multiplication by $2^{-4}$) and five bits (multiplication by $2^{-5}$) respectively.

On the other hand, the field position signal and the A/B control signal are input to a coefficient control circuit 237 via input terminals 232, 233, respectively. The coefficient control circuit 237 controls the multiplexers 235, 236. More specifically, and with reference to Table 3 when an arithmetic operation is performed using the value of the coefficient A at the position X of the line signal in the field, data shifted by 5 bits (or multiplied by $2^{-5}$) are selected at the multiplexer 235 and summed at the summation circuit 234 with the data shifted by three bits (or multiplied by $2^{-3}$), so that the 8-bit input $D_7-D_0$ is effectively multiplied by $(2^{-3}+2^{-5})$, and the summed data is selected by the multiplexer 236. Similarly, when an arithmetic operation is performed using the value of the coefficient B at the position X of the line position in the field, data shifted by 4 bits (or multiplied by $2^{-4}$) are selected at the multiplexer 235 and summed at the summation circuit 234 with data shifted 3 bits (or multiplied by $2^{-3}$), so that multiplication by $(2^{-3}+2^{-4})$ is effected and this summation signal is selected at the multiplexer 236. In performing an arithmetic operation employing the coefficient A at the position Y of the line signal in the field, the value of 0, which is the other data, is selected at the multiplexer 236. In performing an arithmetic operation employing the value of the coefficient B at the position Y of the line signal in the field, data shifted by 5 bits or multiplied by $2^{-5}$ are selected at the multiplexer 235 and summed at the summation circuit 234 with data shifted by 3-bits or multiplied by $2^{-3}$, so that, in effect, multiplication by $(2^{-3}+2^{-5})$ is carried out and the summed data are selected at the multiplexer 236.

As described above, the input line signal data are shifted in the direction of the lower order bits and the shifted data are summed to provide weighted line signals to reduce the size of the circuit relative to conventional circuits which perform the same arithmetic operations. The values shown in Tables 4 and 5 show the values selected so that the circuit may be implemented as a variable coefficient multiplier with the use of bit shifting and summation elements.

TABLE 4

| | Coefficient Set A | | | |
|---|---|---|---|---|
| m | A1m | A2m | A3m | A4m |
| 1 | 0 | 1 | 0 | 0 |
| 2 | $-(2^{-4} + 2^{-5}) =$ $-0.09375$ | $2^{-1} + 2^{-2} + 2^{-4} =$ 0.8125 | $2^{-2} + 2^{-5} =$ 0.28125 | 0 |
| 3 | $-(2^{-5} + 2^{-6}) =$ $-0.046875$ | $2^{-1} + 2^{-2} + 2^{-3} =$ 0.875 | $2^{-2} + 2^{-6} =$ 0.265625 | $-(2^{-4} + 2^{-5}) =$ $-0.09375$ |
| 4 | 0 | $2^{-1} + 2^{-2} + 2^{-3} =$ 0.875 | $2^{-3} =$ 0.125 | 0 |

TABLE 5

| | Coefficient Set B | | | |
|---|---|---|---|---|
| m | B1m | B2m | B3m | B4m |
| 1 | 0 | 1 | 0 | 0 |
| 2 | $-2^{-4} =$ $-0.0625$ | $2^{-2} =$ 0.25 | $2^{-1} + 2^{-2} + 2^{-4} =$ 0.8125 | 0 |
| 3 | $-(2^{-4}) =$ $-0.0625$ | $2^{-2} + 2^{-3} =$ 0.375 | $2^{-1} + 2^{-2} + 2^{-4} =$ 0.8125 | $-(2^{-3}) =$ $-0.125$ |
| 4 | 0 | $2^{-2} + 2^{-5} =$ | $2^{-1} + 2^{-2} + 2^{-4} =$ | $-(2^{-4} + 2^{-5}) =$ |

TABLE 5-continued

| | | Coefficient Set B | | |
|---|---|---|---|---|
| m | B1m | B2m | B3m | B4m |
| | | 0.28125 | 0.8125 | −0.09375 |

Next, the physical gain and delay characteristics of line signals formed with use of the values of the coefficient sets shown in Tables 4 and 5 are explained.

In the first example, the thus formed line signals in each of the fields $F_A$ and $F_B$ are located in the third to the (L−1)th line ($3 \leq n \leq L−1$).

Figure 22:
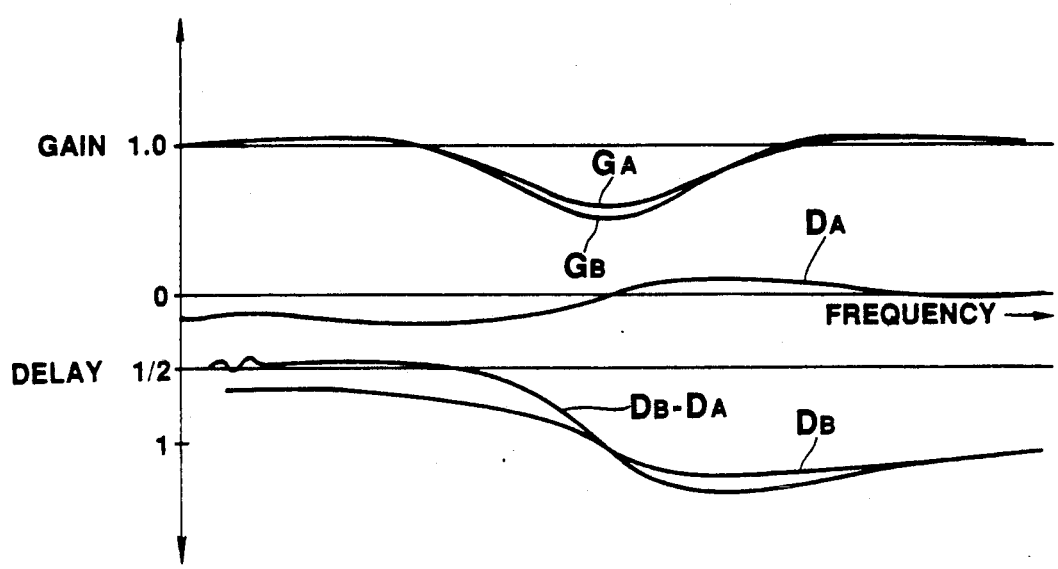
FIG. 22 is a chart for illustrating gain and delay characteristics of line signals formed by weighted mean processing and located at field positions apart from the upper and lower ends of the picture.

FIG. 22 shows representative gain and delay characteristics obtained when the values of the coefficient sets Alm, Blm are set to values corresponding to m=3 in Table 4. In this case, as shown in FIG. 22, the gain $G_A$ is close to the gain $G_B$ so that image flicker is suppressed sufficiently. The relative difference between the delay $D_A$ and the delay $D_B$ is about ½ line so that vertical image movement is also suppressed sufficiently.

The above mentioned weighted mean calculating operation is now considered for those portions of field $F_A$ and $F_B$ in the vicinity of the upper and lower extremes thereof.

When the values of the above described coefficient sets (those for m=3 in Tables 4 and 5) are used for the values of the weighing coefficient sets Alm, Blm, that is, when the values of the coefficient sets are fixed, as in conventional practice, the values of the line signals at the position t on the second lines of the field $F_A$ and $F_B$ are expressed by $$x(2,t) = A1_3 \cdot v(3,t) + A2_3 \cdot v(2,t) + A3_3 \cdot v(1,t) + A4_3 \cdot v(0,t)$$

$$y(2,t) = B1_3 \cdot v(3,t) + B2_3 \cdot v(2,t) + B3_3 \cdot v(1,t) + B4_3 \cdot v(0,t)$$

Figure 23:
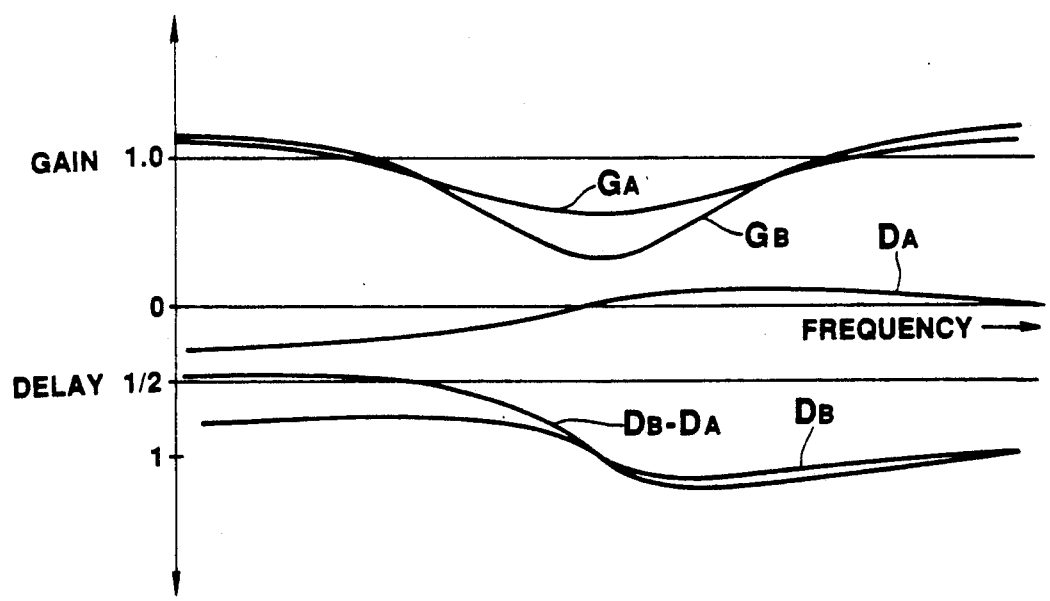
FIG. 23 is a chart for illustrating gain and delay characteristics of the line signal of a field in the vicinity of the upper end of the picture, formed with a fixed value weighting coefficient.

FIG. 23 shows gain and delay characteristics for this case. As shown in this figure, the gains $G_A$ and $G_B$ differ considerably so that flicker is produced. This is the consequence of using a line signal value v(0, t) which is outside the effective video signal range. If the coefficients $A4_3$, $B4_3$ of the signals outside the effective video signal area are simply set to zero, without more, so that the line signal value v(0, t) outside the effective video signal area is not used, a satisfactory result is not obtained.

Therefore, the value of the coefficients Alm, Blm are changed (for m=2 in Tables 4 and 5) and the line signal values at the position t on the second lines of the field $F_A$ and $F_B$ are expressed by $$x(2,t) = A1_2 \cdot v(3,t) + A2_2 \cdot v(2,t) + A3_2 \cdot v(1,t) + A4_2 \cdot v(0,t)$$

$$y(2,t) = B1_2 \cdot v(3,t) + B2_2 \cdot v(2,t) + B3_2 \cdot v(1,t) + B4_2 \cdot v(0,t)$$

Figure 24:
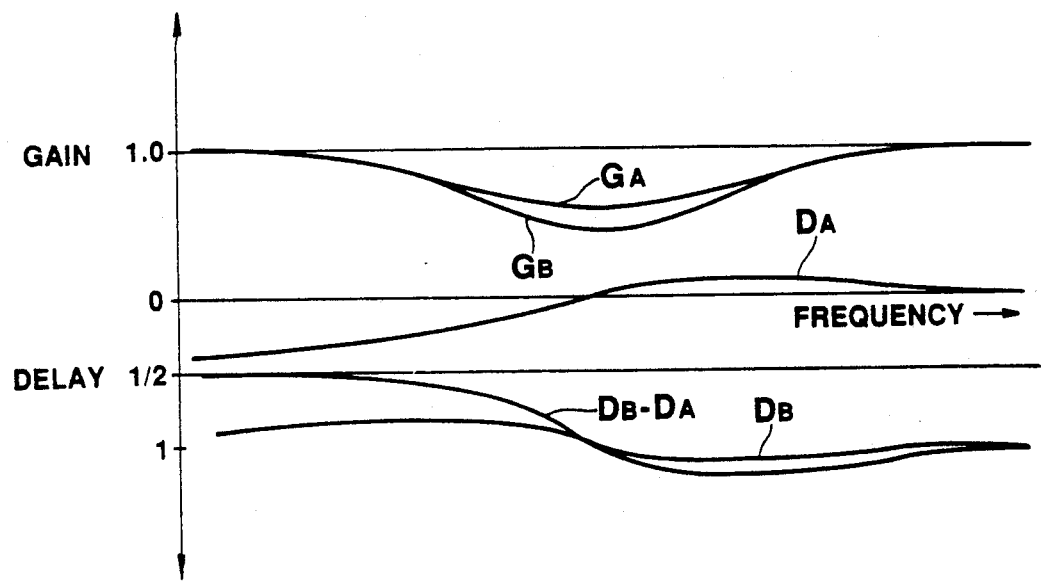
FIG. 24 shows gain and delay characteristics of line signals of an image formed with a weighting coefficient different from that used to form the line signals of FIG. 22.

FIG. 24 shows gain and delay characteristics for this case. It is seen from a comparison of FIGS. 23 and 24 that the gains $G_A$ and $G_B$ are closer to each other. An explanation for this case is made by referring to FIG. 20 wherein the mark indicates the line signals used in a weighted means calculation and the mark O indicates the line signals which are not used. As shown in a portion surrounded by a broken line in FIG. 20, three line signal values v(1, t), v(2, t) and v(3, t) at the position t on the first to third lines included in the effective video signal area are used, whereas the line signal value v(0, t) at the position t on the 0'th line is not used. In other words, the coefficients $A4_3$, $B4_3$ of the 0'th line signal (line signals outside the effective video signal range) are set to zero and the remaining coefficients are set so that the above characteristics are achieved with their use alone.

Similarly, the values of the coefficients sets corresponding to m=1 in Tables 4 and 5 are used for producing the first line signal of the formed field, while the values of the coefficient sets corresponding to m=4 in Tables 4 and 5 are used for producing the last or the L'th line signal.

By selecting the values of the weighing coefficients in association with the line signal position in the field, the gain characteristics of the line signals of the two fields formed by each of the coefficient sets are brought closer together and the relative delay of the line signal of the two fields can be made approximately ½ line, and it becomes possible to suppress flicker and vertical movement of the image at the vertical extremes of the picture to produce a satisfactory picture in its entirety.

Figure 25:
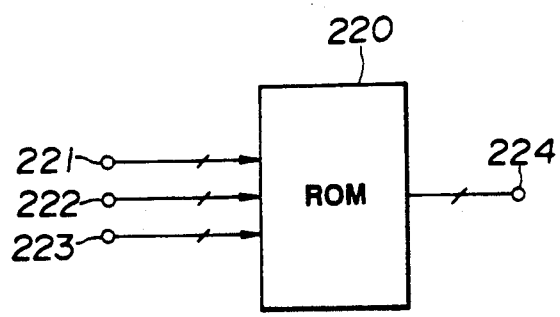
FIG. 25 is a block diagram showing an embodiment of a variable coefficient multiplication circuit employing a read only memory.

An embodiment of a variable coefficient multiplation circuit 214 using the above mentioned read-only-memory is shown in FIG. 25. In this figure, the input terminal 221 corresponds to the input terminal 201 in FIG. 19 and is supplied with an input line signal. The input terminal 222 corresponds to the input terminal 202 in FIG. 19 and is supplied with a field position signal. Th input terminal 223 is connected to the output of the A/B control circuit 219 in FIG. 19, and is fed with the A/B control signal. On the other hand, the output terminal 224 of the ROM 220 is connected to the summation circuit 218 of FIG. 19. Previously weighted line signal values are recorded in the ROM 220. Weighted line signals are produced by using the above mentioned three kinds of signals as the address signals and reading the data recorded in the ROM 220.

Hence, in the above described embodiments of the present invention, odd and even field line signals are obtained by a weighted mean calculating operation for supply to a monitor, whereby it becomes possible to suppress flicker and vertical movement otherwise generated in the vicinity of upper and lower edges of the picture, as well as to suppress flicker and vertical movement of the picture in its entirety.

We claim:

1. A video signal processing circuit for performing error correction and error concealment on input video signal sample data, some of which contain errors and at least some of which are free of errors, comprising:
    error correcting means for correcting at least some of said errors and providing the resulting error corrected sample data, along with error flags indicating any sample data still containing errors at an output of said error correcting means;

one-dimensional error concealment means supplied with said error corrected sample data for performing one-dimensional error concealment using sample data which are on the same line as the sample data indicated to contain error, two-dimensional error concealment means supplied with output data from said one-dimensional error concealment means along with said error flags from said error correcting means, and operative for performing error concealment of said sample data indicated by said error flags to contain errors using other sample data in peripheral and/or time displaced relation to said sample data indicated to contain error, said one-dimensional error concealment means and said two-dimensional error concealment means together having a plurality of error concealment operating modes; and operating mode selecting means for selecting one of said error concealment operating modes in dependence upon the state of the error flags for said peripheral and/or time displaced sample data.

2. The video signal processing circuit according to claim 1, wherein said two-dimensional error concealment means has a plurality of error concealment operating modes, and;

wherein said operating mode selecting means is operative to select one of said plurality of error concealment operating modes of said two-dimensional error concealment means on the basis of said peripheral and/or time displaced sample data.

3. The video signal processing circuit according to claim 2, wherein said two-dimensional error concealment means comprises:

a plurality of interpolating means for replacing said sample data indicated to contain error with one of a plurality of interpolations of said other sample data which include video signal sample data from an adjacent line of the sample data indicated to contain error, and switching means for controlling the selection of the interpolation from the interpolating means to replace said sample data indicated to contain error based on a control signal provided by the operating mode selecting means.

4. The video signal processing circuit of claim 3, wherein said plurality of interpolating means comprises:

horizontal interpolation means for producing an interpolation of said other sample data on the same line as the sample data containing error, and vertical interpolation means for producing an interpolation of said other sample data vertically displaced from the sample data containing error.

5. The video signal processing circuit of claim 4, wherein said vertical interpolation means comprises:

means for producing an interpolation of said other sample data vertically displaced from said sample data containing error and having the same horizontal line position as said sample data containing error, and means for producing an interpolation of said other sample data vertically displaced from sample data containing error and arranged on a diagonal line colinear with the sample data containing error.

6. The video signal processing circuit according to claim 2, wherein said operating mode selecting means comprises means for producing a predicted concealment error signal for an error concealment operation carried out by said error concealment means in each of a plurality of sample data directions established with respect to the sample data indicated to contain error, and wherein the operating mode selecting means is operative to select an error correction operating mode based on said predicted concealment error signals.

7. The video signal processing circuit according to claim 2, wherein said operating mode selecting means is operative to select an error concealment operating mode based on the error flags of said other sample data.

8. The video signal processing circuit according to claim 2, wherein said operating mode selecting means is operative to select an error concealed signal to be output from either said one-dimensional error concealment means or said two-dimensional error concealment means.

9. A video signal processing circuit for performing error correction and error concealment on input video signal sample data, some of which contain errors and at least some of which are free of errors, comprising:

error correcting means for correcting at least some of said errors and providing the resulting error corrected sample data, along with error flags indicating any sample data still containing errors at an output of said error correcting means, and error concealment means supplied with said error-corrected sample data provided at said output and said error flags for performing error concealment of said sample data which are indicated by said error flags to contain errors using other sample data which are in peripheral and/or time displaced relation to said sample data indicated by said error flags to still contain errors;

said error concealment means having a plurality of error concealment operating modes and including selectable recursive replacement error concealment means for error-concealing said sample data indicated to contain error by replacing said sample data with said other sample data which has replaced sample data indicated to contain error, counting means for producing a count signal representing the number of times that the other sample data has been used to conceal error, and selecting means for selecting one of said error concealment operating modes in dependence upon the state of the error flags for said peripheral and/or time displaced sample data, said selecting means being operative to select the recursive concealment means to error-conceal said sample data indicated to contain error based upon the count signal.

10. The video signal processing circuit according to claim 9, wherein the selecting means comprises means for comparing the count signal to a maximum recursion count and disabling recursive concealment when the count signal is at least equal to the maximum recursion count, such that an alternative mode of error concealment is thereupon enabled.

11. The video signal processing circuit according to claim 10, wherein the alternative error concealment mode serves to replace the sample data containing error in a current frame with corresponding sample data from a preceding frame.

12. The video signal processing circuit according to claim 10, wherein the selecting means is operative to select said maximum recursion count from a plurality of possible counts based on the characteristics of the input video signal sample data.

13. The video signal processing circuit according to claim 12, wherein the input video signal sample data is produced by a video tape recorder and wherein the maximum recursion count is selected on the basis of the mode by which the video tape recorder has reproduced the input video signal.

14. The video signal processing circuit according to claim 12, wherein the maximum recursion count is selected on the basis of the error rate of the input video signal.

15. The video signal processing circuit according to claim 10, wherein the selecting means is operative to select said maximum recursion count as a summation of a first value representing the manner in which said other sample data to replace the sample data containing error has been used to error conceal sample data containing error and a second value representing the number of times that said other sample data has been used to error conceal sample data.

16. The video signal processing circuit according to claim 10, wherein the recursive replacement concealment means is operative to replace the sample data containing error with that one of a plurality of said other sample data in neighboring relation thereto which possesses the lowest count signal.

17. A video signal processing circuit for performing error correction and error concealment on input video signal sample data, some of which contain errors and at least some of which are free of errors, comprising:

error correction means for correcting at least some of said errors with the use of a product code employing at least a first and a second series of an error correction code of the input sample data and providing the resulting error corrected sample data, along with error flags indicating any sample data still containing errors at an output of said error correction means, said error correction means comprising gray flag producing means for setting a gray flag of the input sample data when the error correction capability of the error correction means using the second series of the error code is exceeded, and error concealment means supplied with said error corrected sample data provided at said output and said error flags for performing error concealment of said sample data which are indicated by said error flags to still contain errors using other sample data which are in peripheral and/or time displaced relation to said sample data indicated by said error flags to still contain errors, said error concealment means having a plurality of error concealment operating modes and including means for selecting one of said error concealment operating modes in dependence upon the state of the error flags for said peripheral and/or time displaced sample data;

said error concealment means further including:

comparison means for comparing the original sample data with error concealed data produced by the error concealment means to produce a difference signal representing a difference therebetween, and original sample data selection means for selecting the original sample data to be output in place of the error concealed data where the difference signal is within a predetermined acceptance threshold and the gray flag of said original sample data has been set.

* * * * *